(12) United States Patent
Chalkias

(10) Patent No.: US 11,750,400 B2
(45) Date of Patent: *Sep. 5, 2023

(54) BLOCKCHAIN POST-QUANTUM SIGNATURE SCHEME

(71) Applicant: R3 Ltd., London (GB)

(72) Inventor: Konstantinos Chalkias, London (GB)

(73) Assignee: R3 Ltd., London (GB)

( * ) Notice: Subject to any disclaimer, the term of this patent is extended or adjusted under 35 U.S.C. 154(b) by 289 days.

This patent is subject to a terminal disclaimer.

(21) Appl. No.: 17/156,011

(22) Filed: Jan. 22, 2021

(65) Prior Publication Data

US 2021/0176072 A1   Jun. 10, 2021

Related U.S. Application Data

(63) Continuation of application No. 16/024,604, filed on Jun. 29, 2018, now Pat. No. 11,005,664.

(60) Provisional application No. 62/658,474, filed on Apr. 16, 2018.

(51) Int. Cl.
*H04L 9/32* (2006.01)
*H04L 9/08* (2006.01)
*H04L 9/30* (2006.01)
*G06N 10/00* (2022.01)

(52) U.S. Cl.
CPC .......... *H04L 9/3247* (2013.01); *G06N 10/00* (2019.01); *H04L 9/088* (2013.01); *H04L 9/30* (2013.01)

(58) Field of Classification Search
CPC ......... H04L 9/3247; H04L 9/088; H04L 9/30; G06N 10/00
See application file for complete search history.

(56) References Cited

U.S. PATENT DOCUMENTS

| | | | |
|---|---|---|---|
| 10,116,450 B1 | 10/2018 | Brown | |
| 11,005,664 B2 * | 5/2021 | Chalkias | ............... G06N 10/00 |
| 2017/0244568 A1 | 8/2017 | Brickell | |
| 2018/0091309 A1 | 3/2018 | Misoczi | |
| 2019/0319797 A1 | 10/2019 | Suresh | |
| 2019/0319799 A1 | 10/2019 | Suresh | |
| 2019/0319800 A1 | 10/2019 | Misoczki | |

OTHER PUBLICATIONS

Stark (Pseudo-Random Number Generator using SHA-256, 2 pages, Last modified Jan. 11, 2017). (Year: 2017).*
Bernstein, D. J. et al., "SPHINCS: pratical stateless has-based signatures," Advances in Cryptology—EUROCRYPT 2015—35th Annual International Conference on the Theory and Applications of Cryptographic Techniques, Sofia, Bulgaria, Apr. 26-30, 2015, pp. 368-397.
Lamport, L., "Constructing Digital Signatures for a One Way Function," SRI Int'l, CLS-98, Oct. 18, 1979.

(Continued)

*Primary Examiner* — Oleg Korsak
(74) *Attorney, Agent, or Firm* — Perkins Coie LLP

(57) ABSTRACT

Various systems for providing secure signatures based on post-quantum computing are provided. The systems allow may one-time signatures ("OTS") to be based on the same public key. The systems provide for efficient use of OTS signatures with blockchains. The systems provide for rapid verification of signatures. The systems provide for caching for Winternitz-based OTS schemes and for use of short checksum.

73 Claims, 24 Drawing Sheets

(56) References Cited

OTHER PUBLICATIONS

Merkle, R.C., "A Certified Digital Signature," Advances in Cryptology-CRYPTO-89, 1989, pp. 218-238.
Wong, D., "Hash-Based Signatures Part I: One-Time Signatures (OTS)," Cryptography Services, Dec. 4, 2015, https://cryptoservices.github.io/quantum/2015/12/04/one-time-signatures.html.
Wong, D., "Hash-Based Signatures Part II: Few-Times Signatures," Cryptography Services, Dec. 7, 2015, https://cryptoservices.github.io/quantum/2015/12/07/few-times-signatures.html.
Wong, D. "Hash-Based Signatures Part III: Many-Times Signatures," Cryptography Services, Dec. 7, 2015, https://cryptoservices.github.io/quantum/2015/12/2017/many-times-signatures.html.
Wong., D., "Hash-Based Signatures Part IV: XMSS and SPHINCS," Cryptography Services, Dec. 8, 2015, https://cryptoservices.github.io/quantum/2015/12/08/XMSS-and-SPHINCS.html.
Nakamoto, Satoshi, "Bitcoin: A Peer-to-Peer Electronic Cash System," http://www.bitcoin.org/bitcoin.pdf, pp. 1-9, Jul. 4, 2010.
Husling, A. et al. "Mitigating Multi-Target Attacks in Hash-based Signatures," Proceedings of 19th IACR International Conference on Practice and Theory in Public-Key Cryptography, Taipei, Taiwan, Mar. 6-9, 2016. pp. 387-416.
Bellare, M. et al. Collision-Resistant Hashing: Towards Making UOWHFs Practical,: Advances in Cryptology—CRYPTO-97, 1997, pp. 470-484.
Buchmann, J. et al. "XMSS—Practical Forward Secure Signature Scheme based on Minimal Security Assumptions," Post-Quantum Cryptography—PQCrypto—2011, LNCS 7071, Pringer-Verlag, 2011, pp. 117-129.
International Search Report and Written Opinion issued for PCT/GB2019/051088 dated Aug. 19, 2019, 18 pages.
Huelsing, T. et al. "XMSS: Extended Hash-Based Signatures draft-irtf-cfrg-xmss-hash-based-signatures-12", Crypto Forum Research Group, Internet Engineering Task Force; Standawardworkingdraft, Internet Society (ISOC) 4, Rue Des Falises CH-1205 GE, No. 12, Jan. 10, 2018, pp. 1-72.
Shoufan, A. et al. "A Novel Cryptoprocessor Arrchitecture for Chained Merkle Signature Scheme", Microprocessors and Microsystems, vol. 35, No. 1, Feb. 11, 2011, pp. 34-47.
Aggarwal, D. et al., "Quantum attacks on Bitcoin, and how to protect against them", arvix.org, Cornell University Library, Oct. 28, 2017.
Brown et al., Corda: An Introduction, Aug. 2016, 15 pages, Year: 2016.

\* cited by examiner

BLOCKCHAIN POST-QUANTUM SIGNATURE SCHEME

CROSS-REFERENCE TO RELATED APPLICATION(S)

This application is a continuation of U.S. patent application Ser. No. 16/024,604 filed Jun. 29, 2018, which claims the benefit of U.S. Provisional Application No. 62/658,474, filed on Apr. 16, 2018, which is hereby incorporated by reference in its entirety.

BACKGROUND

The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner, as represented by the new owner public key. The signing by the owner of the bitcoin is an authorization by the owner to transfer ownership of the bitcoin to the new owner via the new transaction. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions fora bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UTXO") set because it tracks the output of all transactions that have not yet been spent.

Although the bitcoin system has been very successful, it is limited to transactions in bitcoins or other cryptocurrencies. Efforts are currently underway to use blockchains to support transactions of any type, such as those relating to the sale of vehicles, sale of financial derivatives, sale of stock, payments on contracts, and so on. Such transactions use identity tokens, which are also referred to as digital bearer bonds, to uniquely identify something that can be owned or can own other things. An identity token for a physical or digital asset is generated using a cryptographic one-way hash of information that uniquely identifies the asset. Tokens also have an owner that uses an additional public/private key pair. The owner public key is set as the token owner identity, and when performing actions against tokens, ownership proof is established by providing a signature generated by the owner private key and validated against the public key listed as the owner of the token. A person can be uniquely identified, for example, using a combination of a user name, social security number, and biometric (e.g., fingerprint). A product (e.g., refrigerator) can be uniquely identified, for example, using the name of its manufacturer and its serial number. The identity tokens for each would be a cryptographic one-way hash of such combinations. The identity token for an entity (e.g., person or company) may be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection may be a cryptographic one-way hash of the digital tokens of the assets in the collection. The creation of an identity token for an asset in a blockchain establishes provenance of the asset, and the identity token can be used in transactions (e.g., buying, selling, insuring) involving the asset stored in a blockchain, creating a full audit trail of the transactions.

To record a simple transaction in a blockchain, each party and asset involved with the transaction needs an account that is identified by a digital token. For example, when one person wants to transfer a car to another person, the current owner and next owner create accounts, and the current owner also creates an account that is uniquely identified by the car's vehicle identification number. The account for the car identifies the current owner. The current owner creates a transaction against the account for the car that indicates that the transaction is a transfer of ownership, indicates the public keys (i.e., identity tokens) of the current owner and the next owner, and indicates the identity token of the car. The transaction is signed by the private key of the current owner, and the transaction is evidence that the next owner is now the current owner.

To enable more complex transactions than bitcoin can support, some systems use "smart contracts." A smart contract is computer code that implements transactions of a contract. The computer code may be executed in a secure platform (e.g., an Ethereum platform, which provides a virtual machine) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset. The inputs to a smart contract to sell a car may be the identity tokens of the seller, the buyer, and the car and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is in Canadian dollars, the computer code may retrieve a currency exchange rate, determine how many Canadian dollars the seller's account should be debited, and record the exchange rate. If either transaction is not successful, neither transaction is recorded.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide which transactions to keep and which transactions to discard. Although the execution of the computer code at each node helps ensure the authenticity of the blockchain, it requires large amounts of computer resources to support such redundant execution of computer code.

Although blockchains can effectively store transactions, the large amount of computer resources, such as storage and computational power, needed to maintain all the replicas of the blockchain can be problematic. To overcome this problem, some systems for storing transactions do not use blockchains, but rather have each party to a transaction maintain its own copy of the transaction. One such system is the Corda system developed by R3, Ltd., which provides a decentralized distributed ledger platform in which each participant in the platform has a node (e.g., computer system) that maintains its portion of the distributed ledger. When parties agree on the terms of a transaction, a party submits the transaction to a notary, which is a trusted node (or cluster of nodes), for notarization. The notary maintains an UTXO database of unspent transaction outputs. When a transaction is received, the notary checks the inputs to the transaction against the UTXO database to ensure that the outputs that the inputs reference have not been spent. If the inputs have not been spent, the notary updates the UTXO database to indicate that the referenced outputs have been spent, notarizes the transaction (e.g., by signing the transaction or a transaction identifier with a public key of the notary), and sends the notarization to the party that submitted the transaction for notarization. When the party receives the notarization, the party stores the notarization and provides the notarization to the counterparties.

An important part of any distributed ledger system is the public key cryptographic techniques used to sign the transactions. Most current public key cryptographic techniques are considered to be secure in the sense that the complexity of algorithms to break the public key cryptographic techniques, given the current state of the art in computer technology, is be exponential time. However, because of recent considerable advances in quantum computing technology, it is thought that many of these public key cryptographic techniques could be broken in polynomial time. For example, implementations of Shor's algorithm could factor an integer of size n in polynomial time, which would break Rivest-Shamir-Adleman ("RSA") encryption. As another example, implementation of Shor's algorithm could efficiently solve discrete logarithms, which would break elliptical curve encryption techniques such as Elliptical Curve Digital Signature Algorithm ("ECDSA") encryption.

The impact of breaking public key cryptography would be disastrous for the computing industry because the public key infrastructure would be broken. Public distributed ledgers would be particularly vulnerable because (a) information is usually public (e.g., Bitcoin, Ethereum) allowing offline attacks, (b) in active, unused, or lost keys might hold assets or coins for years, and (c) transaction might not go through or be delayed for various reasons leaving a window for attacks even when hashed public key (i.e., addresses) are used, and (d) there is economic incentive for hackers to get access in distributed ledger accounts. The Bitcoin system attempts to mitigate this vulnerability by not exposing a public key corresponding to the private key used to sign a transaction until the output of that transaction is spent. However, once the output is spent, the public key is publicly available and the private key could be generated by an implementation of Shor's algorithm. To further mitigate the risk that public keys, once publicly available, could be used to generate the corresponding private keys, modern Bitcoin clients, such as wallet systems, generate a new private/public key pair and a corresponding new address for every transaction. Nevertheless, older Bitcoin clients and some mining pools still reuse addresses. Another risk to the Bitcoin system is that prior to 2012, addresses were simply public keys, rather than hashes of the public keys. As a result, pre-2012 transactions with unspent output (or even transactions with spent output) can have their corresponding private keys generated by an implementation of Shor's algorithm. Another risk to the Bitcoin system occurs when a new transaction, which includes the public key corresponding to the address of the input transaction, is broadcast across the Bitcoin network for insertion into a block of Bitcoin blockchain. A recipient of the new transaction (e.g., a miner) could generate the private key from the public key. The recipient could then quickly create an alternate transaction that includes the signature of the same input transaction generated with the private key and broadcast the alternate transaction in hopes that the alternate transaction is added to the Bitcoin blockchain instead of the new transaction.

To address this concern, post-quantum cryptography is dealing with the design and evaluation of techniques that will survive the quantum computing security threat. Many of these techniques employ one-time signature ("OTS") schemes because they are thought to be unbreakable even with quantum computing. One OTS scheme is Lamport OTS, which has many variations. (See, Lamport, L., "Constructing Digital Signatures for a One Way Function," SRI CLS-98, Oct. 18, 1979.) According to a simple variation, to sign a message, Lamport OTS generates an OTS key pair that includes an OTS private key and an OTS public key. The OTS private key (or OTS signature key) includes a private key pair for each bit of the message to be encrypted. Each private key pair includes a pair of random numbers as private keys of the private key pair. So, for example, if the message is 256 bits, the OTS private key includes 256 private key pairs. Lamport OTS then generates an OTS public key (OTS verification key), which includes a public key pair for each private key pair. Each public key pair includes a hash of each of the two private keys of the corresponding private key pair. The OTS public key (or hash of the OTS public key) is then published. To sign the message, the signer generates an OTS signature that includes one of the two private keys of each private key pair based on the value of the corresponding bit of the message, for example, selecting the first private key of the private key pair if the bit value is 0 and the second private key of the private key pair if the bit value is 1. Continuing with the example, the OTS signature includes 256 private keys. To verify the OTS signature of a message, the verifier generates a hash of each of the 256 private keys of the OTS signature, which should correspond to 256 of the public keys, depending on the value of the message. The verifier compares the 256 hashes of the private keys to the 256 public keys of the OTS public key based on the bit value of the message. If they all match, then the signature is verified.

Another OTS scheme is the Winternitz OTS ("WOTS"), which also has many variations. (See, Merkle, R. C., "A Certified Digital Signature," Advances in Cryptology-CRYPTO-89, 1989, pp. 218-238.) According to one simple variation, to sign a message, WOTS generates one private key for each bit of the message. WOTS then generates a WOTS public key that includes a public key for each private key that is a double hash of the private key. To sign a message, the signer generates a WOTS signature that includes the private key or a hash of the private key based on the value of the corresponding bit of the message. To verify the signature, the verifier regenerates the WOTS public key by hashing each value of the signature once or twice based on the value of the corresponding bit of the message. If the regenerated WOTS public key matches the published WOTS public key, the signature is verified. Implementations of WOTS typically sign groups of four bits at a time using a chain of 16 hashes to represent each of the 16 possible values of the group.

DETAILED DESCRIPTION

Figure 1:
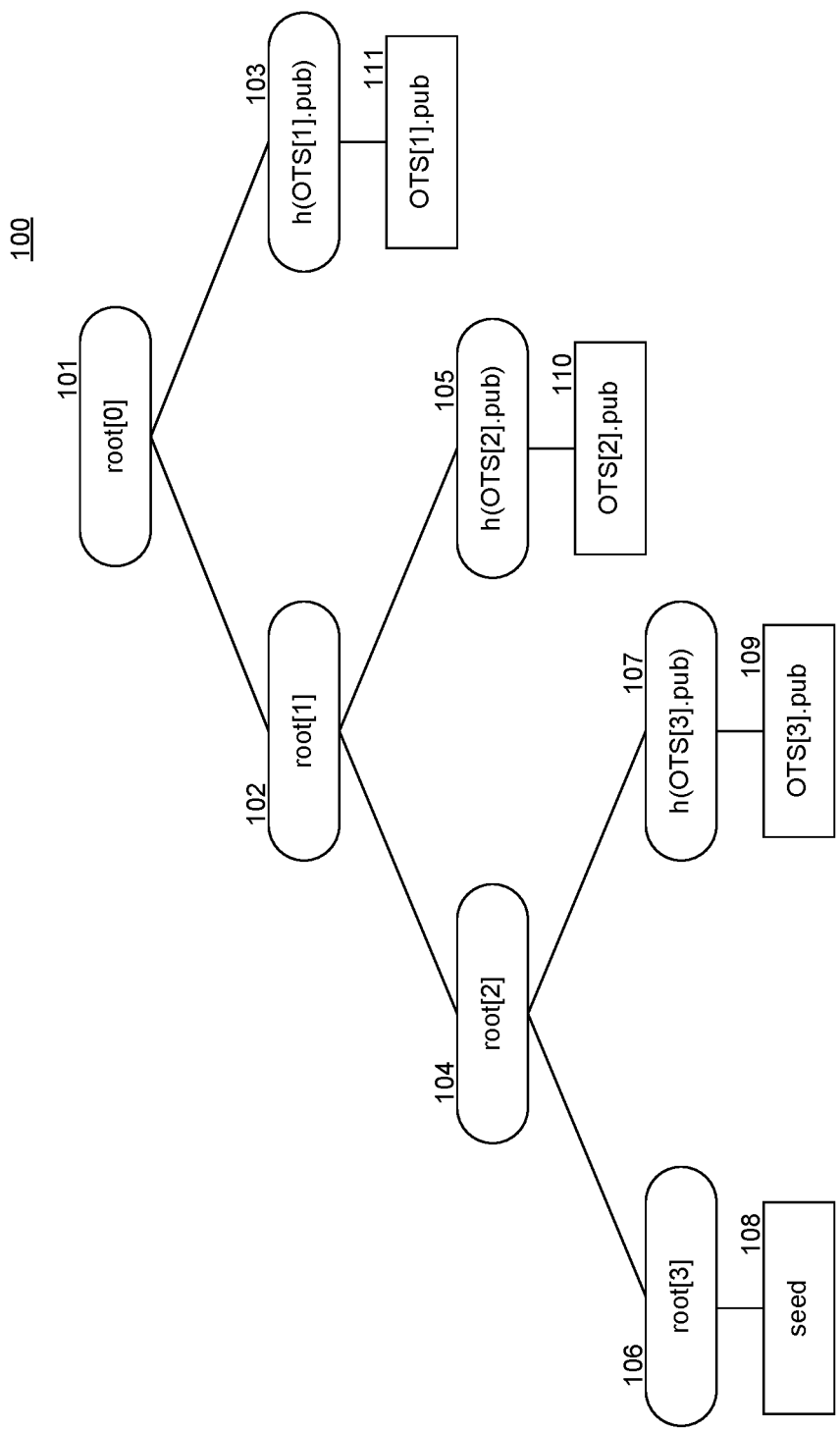
FIG. 1 illustrates a chain of Merkle trees for a BPQS-Few scheme in some embodiments.

In some embodiments, a Blockchain Post-Quantum Signature ("BPQS") system is provided that allows addresses to be reused without exposing sufficient information that would allow a private key to be generated and used to sign a valid transaction. The BPQS system provides a BPQS-Few scheme that allows addresses to be reused a predetermined number of times and a BPQS-Many scheme that allows addresses to be reused an unlimited number of times. The BPQS-Few scheme initially generates the predetermined number of OTS key pairs, which results in a higher initial overhead and the generating of OTS key pairs that may never be used to sign a message. The BPQS-Many scheme initially generates only one OTS key pair and dynamically generates additional OTS key pairs as needed, which results in a lower initial overhead and a higher overhead after the first signing but allows an unlimited number of signatures. To combine the benefits of both schemes, the BPQS system provides a BPQS-Combined scheme that initially generates a predetermined number of OTS key pairs and, once those OTS key pairs are used to sign messages, dynamically generates each additional OTS key pair. When an additional OTS key pair is to be generated, a variation of the BPQS-Combined scheme may actually generate multiple OTS key pairs based on the BPQS-Few scheme and again combined with the BPQS-Many scheme. In this way, the BPQS-Combined scheme may dynamically generate groups of OTS key pairs.

In the following, the BPQS system is described primarily using an OTS scheme that is a basic variation of a Lamport OTS. The BPQS system may, however, employ other OTS schemes such as other variations of Lamport OTS and variations of WOTS. In addition, the signing of a message is referred to as signing the message directly or signing a hash of the message (i.e., a digest of the message). A hash of the message is signed when the number of bits in the message is greater than the number of number of private key pairs in the OTS private key used for signing. Also, the published OTS public key for an OTS key pair can be a hash of the values of the public key pairs of an OTS key pair. Alternatively, the published OTS public key can be simply the values of the public key pairs of an OTS public key or a hash of those values.

Few-Many-Combined Schemes

In some embodiments, the BPQS-Few scheme initially generates a predetermined number of OTS key pairs. The BPQS-Few scheme generates a Few public key that is a hash derived from the OTS public keys of the OTS key pairs. The Few public key is then published. To sign a message, the signer selects as a signing OTS key pair an OTS key pair that has not been used and signs the message with the OTS private key of the signing OTS key pair. The signature is referred to as an OTS signature. As used in the following, an OTS signature includes a signature and OTS metadata. The signature includes the private keys of the signing OTS key pair corresponding to the bit values of the message and the OTS metadata incudes the public keys of the signing OTS key pair not corresponding to the bit values. The signer then generates a Few signature that includes the OTS signature and Few metadata so that the Few public key can be regenerated using the message and the Few signature. The Few metadata includes a hash derived from the OTS public keys of the OTS key pairs that have not yet been used to sign a message and an OTS hash public key for each OTS key pair that has already been used. The OTS hash public key for an OTS key pair is a hash of the OTS public key of the OTS key pair. The Few public key is a hash derived from the OTS hash public keys for the OTS key pairs. To verify the Few signature, the verifier regenerates the OTS public key using the OTS signature of the Few signature and the message and regenerates a Few public key using the regenerated OTS public key and the Few metadata. If the regenerated Few public key matches the published Few public key, then the signature is verified. The same process for signing and verifying can be repeated for each OTS key pair that has not been used to sign a message. The term "message" refers to any electronic data, such as transactions of distributed ledgers, emails, data files, data packets, hash of the electronic data, and so on.

In some embodiments, the BPQS-Many scheme initially generates only one OTS key pair for signing messages, but also generates a fallback OTS key pair. The Many public key is a hash derived from the OTS public key of the OTS key pair and the fallback OTS public key of the fallback OTS key pair. Many public key is then published. To sign a message, the signer signs the message with the OTS private key of the OTS key pair to generate an OTS signature. The signer then generates a Many signature that includes the OTS signature and Many metadata so that the Many public key can be regenerated using the message and the Many signature. The Many metadata includes a hash derived from the fallback OTS public key. To verify the signature, the verifier regenerates the OTS public key based on the OTS signature and the message. The verifier also regenerates a Many public key using the regenerated OTS public key and the Many metadata. If the regenerated Many public key matches the published Many public key, then the signature is verified.

To sign a second message, the signer generates a second OTS key pair and a second fallback OTS key pair and generates a second hash derived from the corresponding OTS public key and fallback OTS public key. The signer then signs the second hash with the initially created fallback OTS private key of the initially created fallback OTS key pair to generate a fallback OTS signature. The signer also signs the second message with the OTS private key of the second OTS key pair to generate a second OTS signature. The signer then generates a second Many signature that includes the second OTS signature and second Many metadata so that the Many public key can be regenerated using the message and the second Many signature. The second Many metadata includes the fallback OTS signature of the second hash, the second hash, and the hash of the initial OTS public key (or, more generally, the hash of the OTS public key for any previously used OTS key).

To verify the second OTS signature, the verifier regenerates the second OTS public key based on the second OTS signature and the second message. The verifier also regenerates the fallback OTS public key based on the fallback OTS signature and second hash of the Many metadata. The verifier then regenerates a Many public key as a hash of a combination of the initial OTS public key of the Many metadata and the regenerated fallback OTS public key. If the regenerated Many public key matches the published Many public key, then the signature is verified. The BPQS-Many scheme uses a similar process when signing and verifying using additional OTS key pairs with Many metadata that includes a hash derived from the OTS public key of each of the previously used OTS key pair.

The BPQS-Few scheme can be represented using a chain of hash trees (e.g., Merkle trees) that each have two leaf nodes. Each hash tree includes one leaf node that contains the hash of an OTS public key and one leaf node that contains the value of the root node of the next hash tree in the chain. Thus, a chain of three hash trees includes the hash of three different public keys. The value of the root node of the first hash tree in the chain is the Few public key. FIG. 1 illustrates a chain of Merkle trees for a BPQS-Few scheme in some embodiments. In this example, the BPQS-Few scheme is used to generate three OTS key pairs and a Few public key. The OTS private keys and the OTS public keys of the OTS key pairs are referenced in the following as OTS[i].priv[n, b] and OTS[i].pub[n, b] where i indexes into the OTS key pairs, n indexes a private key pair or a public key pair, and b represents 0 or 1. OTS[i].priv[ ] represents an OTS private key, and OTS[i].pub[ ] represents an OTS public key. OTS[i].pub[ ] represents an OTS public key. The h(OTS[i].pub[ ]) represents a hash of a concatenation of the public key pairs (OTS[i].pub[ ]) of the OTS key pair. To generate the Merkle tree 100, the BPQS-Few scheme generates a seed 108 and then sets the value of leaf node 106 to a hash of the seed. The BPQS-Few scheme also generates hashes of the OTS public keys 109, 110, 111 and sets the value of the leaf nodes 103, 105, 107 to the value of the hashes of the OTS public keys. The BPQS-Few scheme then generates the hashes for the values of the remaining nodes

101, 102, 104. The values of the nodes 101, 102, 104, 106 are referred to as root[i] because they represent the values of root nodes of a hash tree with two leaf nodes. The value of the node 101 (root[0]) is the Few public key that is published for use in verifying signatures generated using one of the three OTS key pairs used to generate the Few public key.

To generate a first signature for a first message using the BPQS-Few scheme, the signer generates a Few signature (Fewsig) that includes an OTS signature (OTSsig) and Few metadata. To generate the OTS signature, the signer signs a hash of the first message with OTS[1].priv to create a first OTS signature (OTSsig). The first OTS signature includes a signature (sig) and OTS metadata. The signature contains the value of each OTS[1].priv[n, i] where i represents the value of the $n^{th}$ bit of the hash of the first message. The OTS metadata contains the value of each OTS[1].pub[n, ~i] where ~i represents 0 if i is 1 and 1 if i is 0, represented as smd.pub[ ]. The OTS metadata also includes the signature number, which is 1 for the first signature, represented as OTS metadata k (smd.k) and includes the value of node 102 (root[1]) as smd.root[1]. The data structures for the BPQS-Few scheme may be represented as follows. In this example based on a Lamport scheme, each OTS key pair includes in this example 512 (256*2) private keys and 512 public keys and may include a hash of OTS public key so that signer only need generate the hash once.

| OTS key pair (OTS) |
|---|
| priv[256, 2] |
| pub[256, 2] |

The OTS signature includes a signature of a message and OTS metadata that includes 256 public keys:

| OTS signature |
|---|
| signature |
| OTS metadata ("smd") |
| pub[256] |

The Few signature includes an OTS signature and Few metadata that includes the key number, the value of the root for the key number, and hashes of the OTS public key for already used OTS key pairs. (The key number can be omitted as it can be derived from the number of hashes of the OTS public key for already used OTS key pairs.)

| Few signature ("Fewsig") |
|---|
| OTS signature |
| Few metadata ("smd") |
| k |
| root[k] |
| h(OTS[1].pub), . . . , h(OTS[k−1].pub). |

To verify the first signature, the verifier first regenerates the OTS public key from the first OTS signature and the first message. The verifier then regenerates the Few public key as a hash of a concatenation of smd.root[1] and the hash of the regenerated first OTS public key. If the regenerated Few public key matches the published Few public key (root[0]), then the first signature is verified.

To generate a second signature for a second message, the BPQS-Few scheme generates a second Few signature that includes an OTS signature and Few metadata. To generate the OTS signature, the BPQS-Few scheme signs a hash of the second message with OTS[2].priv, which are the private key pairs for signing the second OTS signature. As described above, the OTS signature includes a signature and OTS metadata. The signature contains the value of each OTS[2].priv[n, i] where i represents the value of the $n^{th}$ bit of a hash of the second message. The OTS metadata contains the value of each OTS[2].pub[n, ~i] where ~i represents 0 if i is 1 and 1 if i is 0. The OTS metadata also includes the signature number(smd.k), which is 2 for the second signature, the value of node 104 (smd.root[2]), and the hash of the value of node 103 (smd.h(OTS[1].pub)). The second Few signature is then provided for verification of the second signature.

To verify the second signature, the verifier first regenerates the OTS public key from the second OTS signature and the second message. The verifier then generates a hash of the concatenation of smd.root[2] and the hash of the regenerated OTS public key to generate a value corresponding to the value of root[1]. The verifier then generates a hash of the concatenation of root[1] and smd.h(OTS[1].pub) as the value of root[0]. If the regenerated Few public key matches the published Few public key (root[0]), then the first signature is verified.

The BPQS-Many scheme can be represented using a chain of hash trees that each have two leaf nodes. Each hash tree includes one leaf node that contains the hash of an OTS public key and one leaf node that contains the hash of the fallback OTS public key. The hash tree is considered a chain because each fallback OTS key pair is used to sign the value of the root of the next hash tree in the chain. Thus, a chain of three hash trees includes the hashes of three OTS public keys and three fallback OTS public key as the value of leaf nodes. The value of the root node of the first hash tree in the chain is the Many public key.

Figure 2:
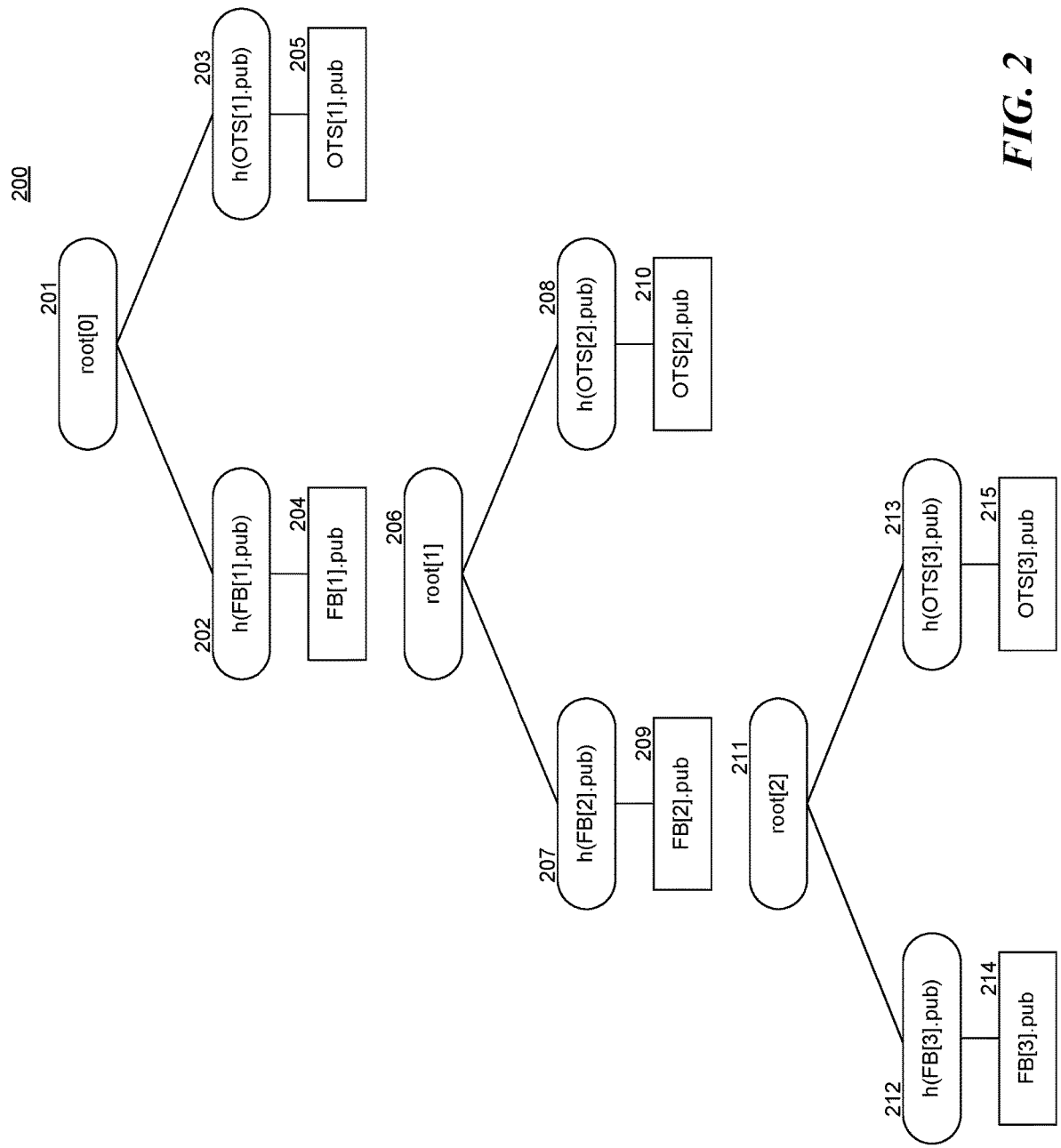
FIG. 2 illustrates Merkle trees for a BPQS-Many scheme in some embodiments.

FIG. 2 illustrates Merkle trees for a BPQS-Many scheme in some embodiments. The BPQS-Many scheme is used to generate OTS key pairs dynamically. The BPQS-Many scheme first generates a first Merkle tree with nodes 201-203. To do so, the BPQS-Many scheme generates a first OTS key pair (OTS[1].priv and OTS[1].pub) and a first fallback OTS key pair (FB[1].priv and FB[1].pub). The BPQS-Many scheme then generates a hash of the first fallback OTS public key (h(FB[1].pub)) as the value of node 202 and a hash of the first OTS public key (h(OTS[1].pub)) as the value of node 203. The BPQS-Many scheme then generates a hash of the concatenation of the values of node 202 and 203 (h(h(FB[1].pub)∥h(OTS[1].pub))) as the value of the root node 201 (root[0]). The value of the root[0] is then published as the Many public key.

To generate a first signature for a first message, the signer generates a first Many signature (Manysig) that includes an OTS signature and Many metadata. To generate the OTS signature, the signer signs a hash of the first message with the first OTS private key (OTS[1].priv). The signer also generates metadata that includes the signature number (smd.k), which is 1 for the first message, and the value of node 202 (smd.h(FB[1].pub)).

To verify the first signature represented by the first Many signature (Manysig), the BPQS-Many scheme first regenerates the OTS public key from the OTS signature of the first Many signature. The BPQS-Many scheme then generates a hash of the concatenation of the hash of the first fallback OTS public key (smd.h(FB[1].pub)) and the hash of the regenerated OTS public key (h(OTS[1].pub)) represented as h(smd.h(FB[1].pub)∥h(OTS[1].pub)) as the value for root[0]. If the value of root[0] matches the Many public key, then the first signature has been verified.

To generate a second signature for a second message, the signer first generates a second Many Merkle tree with nodes 206-208. To do so, the signer generates a second OTS key pair and a second fallback OTS key pair. The signer then generates a hash of the second fallback OTS public key (h(FB[2].pub)) as the value of node 207 and a hash of the second OTS public key (h(OTS[2].pub)) as the value of node 208. The signer then generates a hash of the concatenation of the values of nodes 207 and 208 (h(h(FB[2].pub)∥h(OTS[2].pub))) as the value of node 206 (root[1]).

After the second Merkle tree is generated, the signer generates a second Many signature that includes an OTS signature and Many metadata. To generate the OTS signature, the signer signs a hash of the second message with OTS[2].priv as the private key to create a second OTS signature. The signer then generates Many metadata that includes the signature number (smd.k), the value of node 207 (smd.h(FB[2].pub)), a Root OTS signature (smd.Rootsig[1]) for the value of node 206 (root[1]), and the value of node 203 (h(OTS[1].pub)). The Root signature is the value of node 206 (root[1]) signed with the first fallback OTS private key (FB[1].priv). The Many metadata in general includes the key number, a hash of the fallback OTS public key for the key number, Root OTS signatures for the values that are a hash of the concatenation of a hash of the fallback OTS public key and a hash of the OTS public key for each lower key number (e.g., representing already used fallback OTS keys), and a hash of the OTS public key for each lower level key numbers (e.g., representing already used OTS key pairs). The Many signature is represented as follows:

---

Many signature
   OTS signature
   Many metadata
      k (optional)
      h(FB[k].pub)
      Rootsig[1], . . . , Rootsig[k−1]
      h(OTS[1].pub), . . . , h(OTS[k−1].pub)

---

To verify the second signature represented by the second Many signature (Manysig), the verifier first regenerates the OTS public key (OTS[2].pub) from the OTS signature and the second message. The BPQS-Many scheme then generates a hash of the concatenation of the hash of the second fallback OTS public key (smd.h(FB[2].pub)) and the hash of the regenerated OTS public key (h(OTS[2].pub)) represented as h(smd.h(FB[2].pub)∥h(OTS[2].pub)) as the value for root[1]. The BPQS-Many scheme then regenerates the first fallback OTS public key (FB[1].pub) from the Root signature (smd.Rootsig[1]) and the value for root[1]. The BPQS-Many scheme then generates a hash of the concatenation of the hash of the regenerated first fallback OTS public key (h(FB[1].pub)) and the hash of the first OTS public key (smd.h(OTS[1].pub)) represented as h(h(FB[1].pub)∥smd.h(OTS[1].pub)) as the value for root[0]. If the value of root[0] matches the Many public key, then the second signature has been verified.

Figure 3:
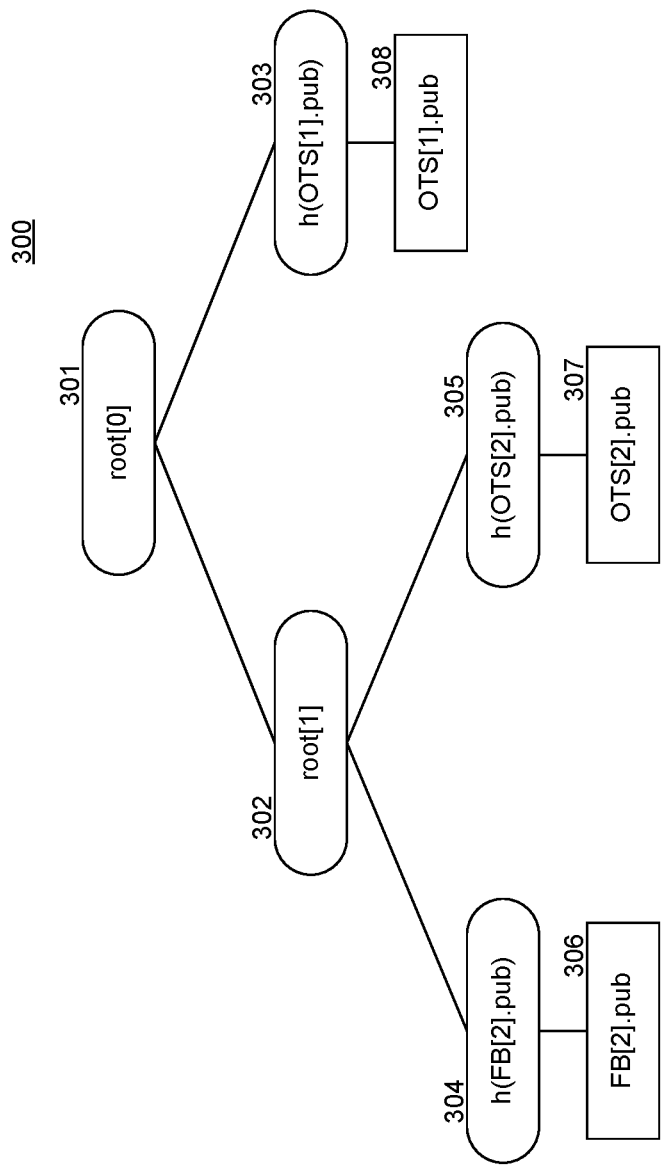
FIG. 3 illustrates Merkle trees for a BPQS-Combined scheme in some embodiments.

FIG. 3 illustrates Merkle trees for a BPQS-Combined scheme in some embodiments. The BPQS-Combined scheme is a combination of the BPQS-Few scheme and the BPQS-Many scheme. The Merkle trees 300 are a chain of two hash trees. A first key number hash tree includes nodes 301-303, and a second key number hash tree includes nodes 302, 304-305. The BPQS-Many scheme initially generates an OTS key pair for the BPQS-Few scheme and an OTS key pair and a fallback OTS key pair for the BPQS-Many scheme. The OTS public keys 307-308 and the fallback OTS public key 306 are used to generate the hashes for the values of leaf nodes 303-305. The BPQS-Combined scheme then generates the values for root node 302 (root[1]) and root node 301 (root[0]). The value of the root node (root[0]) is published as the Combined public key.

The BPQS-Combined scheme employs the BPQS-Few scheme to generate and verify a predefined number of signatures and the BPQS-Many scheme and BPQS-Few scheme to generate and verify any number of subsequent signatures. The BPQS-Combined scheme thus combines the advantages of the BPQS-Few scheme for the predefined number of signatures but allows an unlimited number of signatures using the BPQS-Many scheme and the BPQS-Few scheme for subsequent signatures.

In some embodiments, the BPQS schemes may be used in conjunction with other post-quantum ("PQ") schemes based on various tradeoffs such as the shorter signatures of BPQS schemes and the faster key generation of other PQ schemes. The other PQ schemes may include XMSS-T, which is a stateful scheme, and SPHINCS, which is a stateless scheme. (See, Hulsing, A., Rijneveld, J., and Song, F., "Mitigating Multi-Target Attacks in Hash-based Signatures," Proceedings of 19th IACR International Conference on Practice and Theory in Public-Key Cryptography, Taipei, Taiwan, Mar. 6-9, 2016, pp. 387-416; and Bernstein, D. J., Hopwood, D., Hulsing, A., Lange, T., Niederhagen, R., Papachristodoulou, L., Schneider, M., Schwabe, P., and Wilcox-O'Hearn, Z., "SPHINCS: Practical Stateless Hash-based Signatures," Proceedings of 34th Annual International Conference on the Theory and Applications of Cryptographic Techniques, Sofia, Bulgaria, Apr. 26-30, 2015, pp. 368-97.) Stateful PQ schemes (e.g., BPQS schemes) require a signer to track state that includes the number of times that a message has been signed for a published public or verification key so that the same private or signing key is not re-used. Stateless schemes, in contrast, do not require the maintaining of state as the same signing key can be reused an unlimited number of times. Stateless schemes are, however, generally slower and have larger keys and signatures than stateful schemes. In applications for which smaller sizes of keys and signatures are important (e.g., blockchain applications), the overhead of maintaining state may be an acceptable tradeoff for smaller keys and signatures.

In some embodiments, the BPQS system may provide a BPQS-Mixed scheme that is an adaptation of the BPQS schemes to allow a mix of stateful and stateless schemes to support a published public key. A first version of the BPQS-Mixed scheme employs a first few OTS key pairs based on a stateful scheme (e.g., the BPQS-Few scheme) and a last non-OTS key pair based on stateless scheme (e.g., SPHINCS). The Mixed public key is the value of the root node of a Merkle tree based on the hashes of a first few OTS public keys and a last non-OTS public key. Referring to FIG. 1, the Merkle tree for the first version of the BPQS-Mixed scheme with three few OTS public keys would have the same form but with the seed 108 replaced by the non-OTS public key. The hash of the non-OTS public key could be a leaf node at any level in the Merkle tree, rather than being at the lowest level. Also, the Mixed public key would also have metadata relating to parameters required by the stateless scheme. The first version of the BPQS-Mixed scheme would be used when, for example, it is expected the number of signatures for the Mixed public key would not exceed the number of the few OTS key pairs (e.g., three), but if it did, then an unlimited number of signatures for the Mixed public key could be generated using the last non-OTS private key.

The second version of the BPQS-Mixed scheme is similar to the BPQS-Combined scheme with the fallback OTS key used for signing a hash of the non-OTS public key. Referring to FIG. 3, two OTS key pairs and a fallback OTS key pairs are generated initially as with the BPQS-Combined. If three signatures are needed using the Combined public key, then a non-OTS key pair can be generated with the hash of the non-OTS public key being signed by the fallback OTS private key. The second version of the BPQS-Mixed scheme could be used to dynamically generate any number of OTS key pairs before or after the non-OTS key pair is generated. For example, if a non-OTS key pair is dynamically generated after the first two OTS key pairs are generated, then OTS key pairs could be subsequently dynamically generated for signing (e.g., if smaller signatures are needed). The non-OTS private key that was already generated could be used any time for subsequent signing. The second version of the BPQS scheme would be used to defer the overhead of generating the non-OTS key pair until, and if, it is actually needed for signing.

In some embodiments, the BPQS system may employ bitmasks during construction of a Merkle tree so that the hash functions are not required to be collision resistant. Hash functions that are not collision resistant are subject to hash collision attacks based on the "birthday paradox." The Extended Merkle Signature Scheme ("XMSS") and its variants employ such bitmasks to ensure security against such hash collision attack. (See, Bellare, M. and Rogaway, P., "Collision-Resistant Hashing: Towards Making UOWHFs Practical," Advances in Cryptology—CRYPTO-97, 1997, pp. 470-484; and Buchmann, J., Dahmen, E., and Hulsing, A., "XMSS—A Practical Forward Secure Signature Scheme based on Minimal Security Assumptions," Post-Quantum Cryptography—PQCrypto-2011, LNCS 7071, Springer-Verlag, 2011, pp. 117-129.)

Figure 4:
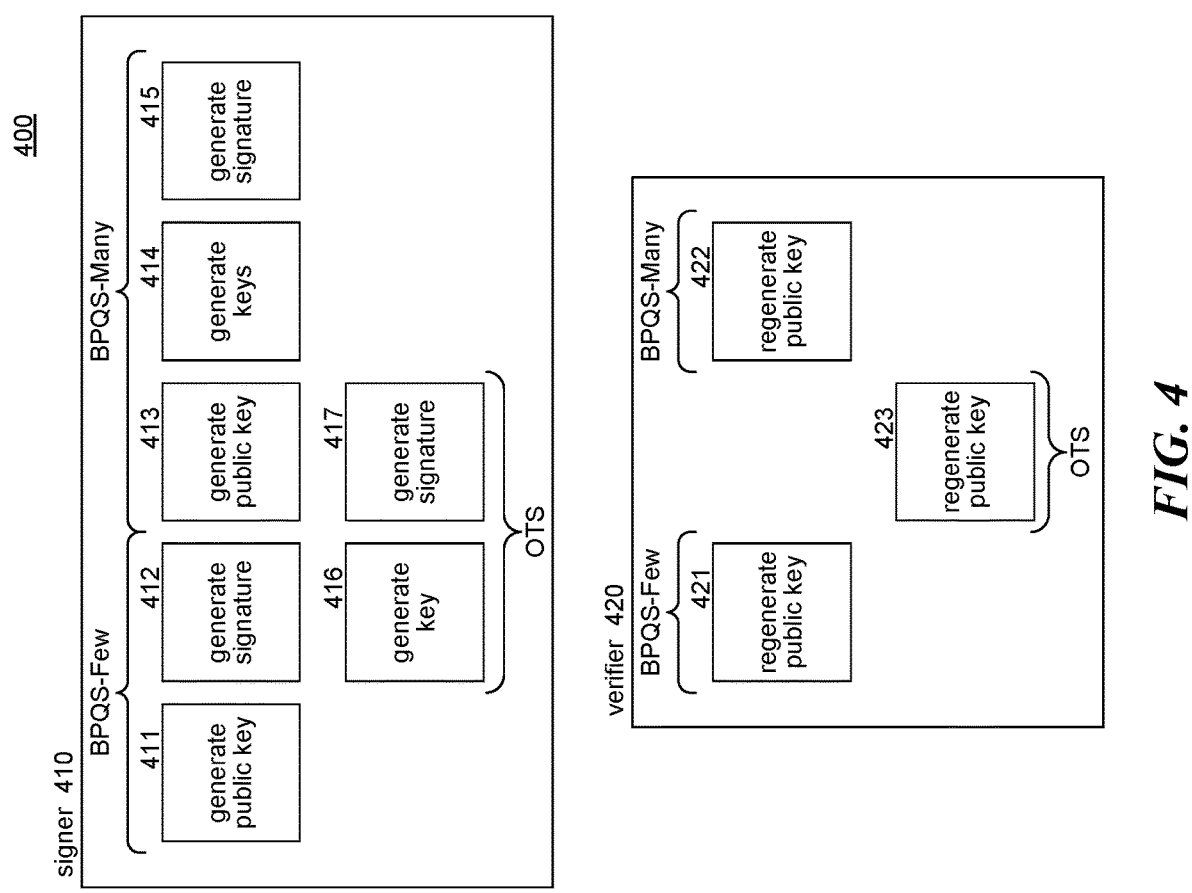
FIG. 4 is a block diagram that illustrates components of the BPQS system in some embodiments.

FIG. 4 is a block diagram that illustrates components of the BPQS system in some embodiments. The BPQS system 400 includes a signer system 410 and a verifier system 420. The signer system is used to sign messages, and the verifier system is used to verify messages. The signer system includes BPQS-Few components, BPQS-Many components, and OTS components. The BPQS-Few components include a generate public key component 411 and a generate signature component 412. The BPQS-Many components include a generate public key component 413, a generate keys component 414, and a generate signature component 415. The OTS components include a generate key component 416 and a generate signature component 417. The verifier system includes a regenerate public key component 421 that is a BPQS-Few component, a regenerate public key component 422 that is a BPQS-Many component, and a regenerate public key component 423 that is an OTS component. The components of the signer system and the verifier system are described below in detail.

The computing systems (e.g., network nodes or collections of network nodes) on which the BPQS system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the BPQS system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The BPQS system may be described in the general context of computer-executable instructions, such as program modules and components, executed by one or more computers, processors, or other devices. Generally, program modules or components include routines, programs, objects, data structures, and so on that perform tasks or implement data types of the BPQS system. Typically, the functionality of the program modules may be combined or distributed as desired in various examples. Aspects of the BPQS system may be implemented in hardware using, for example, an application-specific integrated circuit ("ASIC") or field programmable gate array ("FPGA").

Figure 5:
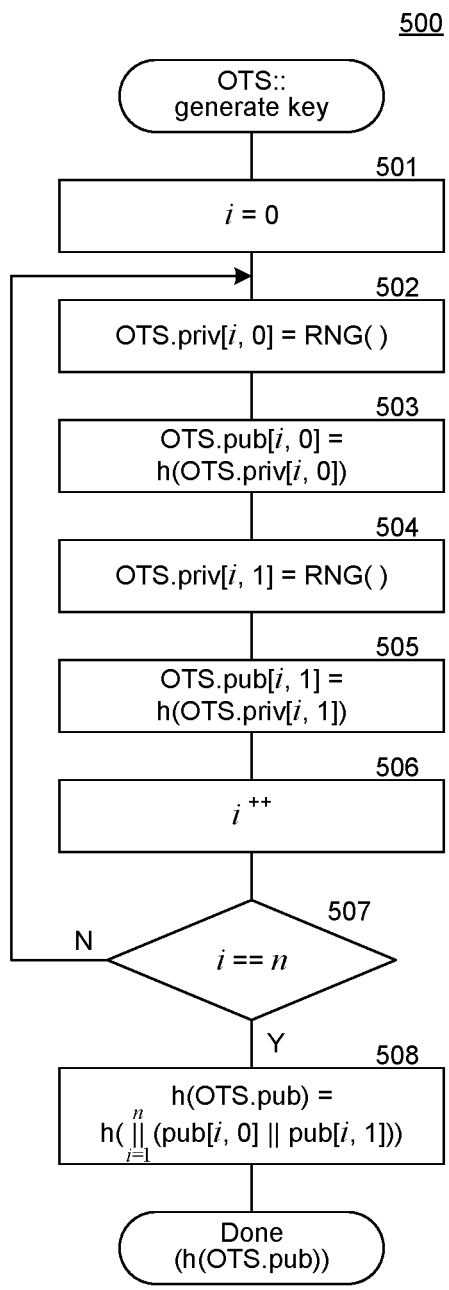
FIG. 5 is a flow diagram that illustrates the processing of a generate key component for the OTS scheme in some embodiments.
Figure 6:
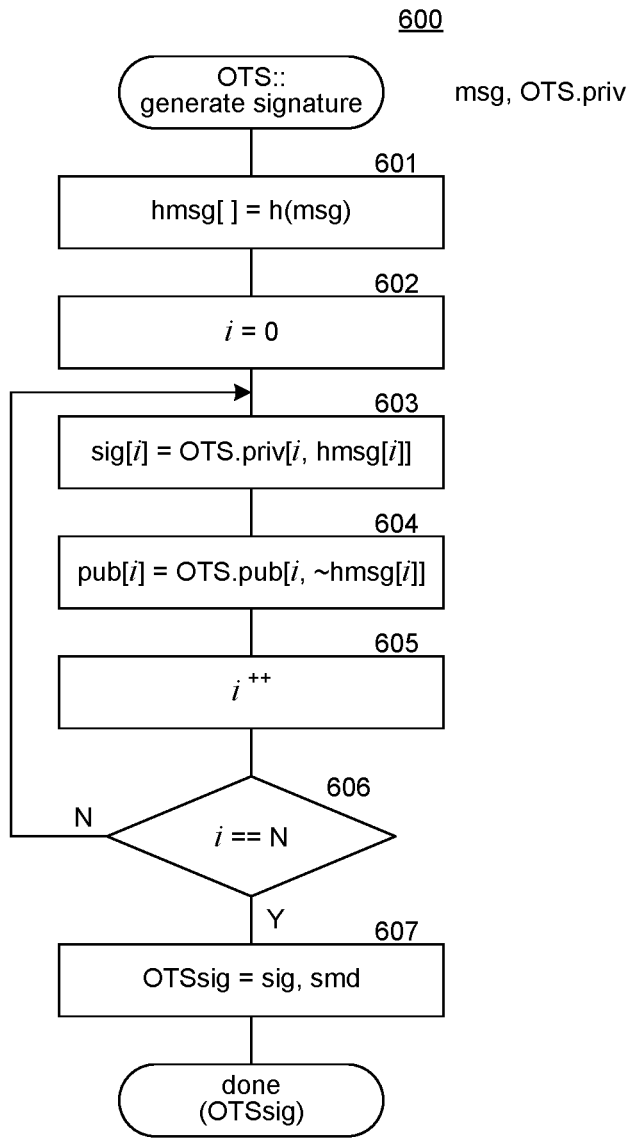
FIG. 6 is a flow diagram that illustrates the processing of a generate signature component for the OTS scheme in some embodiments.
Figure 7:
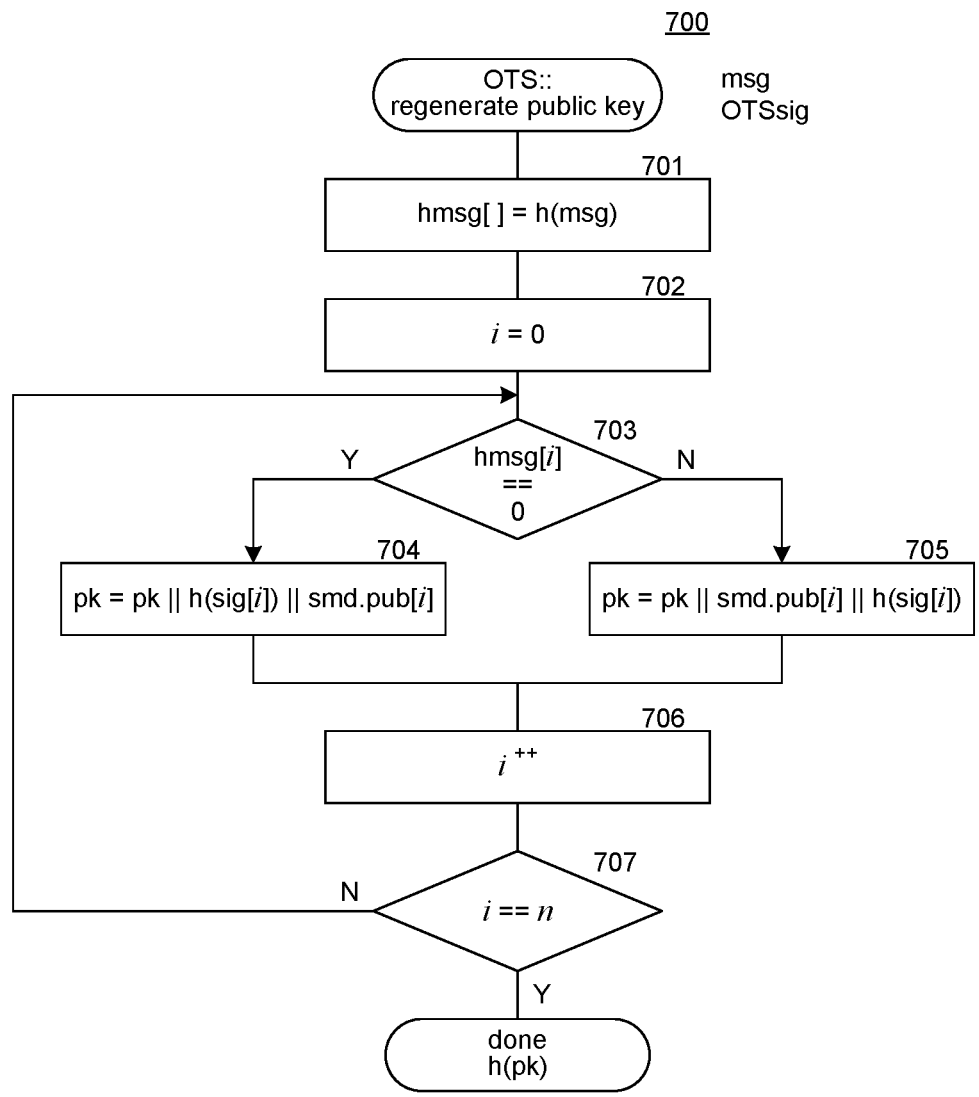
FIG. 7 is a flow diagram that illustrates the processing of a regenerate public key component of the OTS scheme in some embodiments.

FIGS. 5-7 are flow diagrams that illustrate the processing of an OTS scheme in some embodiments. FIG. 5 is a flow diagram that illustrates the processing of a generate key component for the OTS scheme in some embodiments. The generate key component 500 is invoked to generate an OTS key pair with an OTS private key and an OTS public key (OTS.priv and OTS.pub) and generates an OTS hash public key (OTS.hpub). The component performs the processing of blocks 501-507 for the number of keys represented by n. In block 501, the component initializes an index i to represent the number of bits (i.e., n) in the hash of a message to be signed using the OTS key. In block 502, the component sets the indexed private key (OTS.priv[i,0]) for the message value of 0 to a randomly generated number. In block 503, the component sets the corresponding public key (OTS.pub[i, 0]) to a hash of that private key. In block 504, the component sets the indexed private key (OTS.priv[i,1]) for the message value of 1 to a randomly generated number. In block 505, the component sets the corresponding public key (OTS.pub[i, 1]) to a hash of that indexed private key. In block 506, the component increments the index i. In decision block 507, if the index I equals the number of bits n in the hash of the message, then the component continues at block 508, else the component loops to block 502. In block 508, the component sets the OTS hash public key (h(OTS.pub)) to a hash of the concatenations of all the public keys where ∥ represents concatenation ranging over the index.

FIG. 6 is a flow diagram that illustrates the processing of a generate signature component for the OTS scheme in some embodiments. The generate signature component 600 is passed an indication of a message and the OTS private key (OTS.priv) of an OTS key pair and generates an OTS signature (OTSsig) that includes a signature (sig) and OTS metadata (pub). In block 601, the component generates a hash of the message. The hash of the message may include, for example, 256 bits. Alternatively, the message that is passed may already be a hash of content to be signed. In blocks 602-605, the component loops through each of the bits of the hash, setting the signature to the value of the private key based on the value of that bit. In block 602, the component initializes an index i for indexing through the bits of the hash of the message. In block 603, the component sets the signature corresponding to the indexed bit (sig[i]) to the private portion for that bit based on the value of the hash of the message for that bit (OTS.priv[i, hmsg[i]). In block 604, the component sets the OTS metadata corresponding to the indexed bit (pub[i]) to the value of the public portion for that bit based on a value that is not the value of the hash of the message for that bit (OTS.pub[i, ~hmsg[i]). In block 605, the component increments the index. In decision block 606, if the index is equal to the number n of the bits in the hash, then the component continues at block 607, else the component loops to block 603 to generate the signature for the next bit of the hash of the message. In block 607, the component combines the signature and OTS metadata to generate the OTS signature and completes.

FIG. 7 is a flow diagram that illustrates the processing of a regenerate public key component of the OTS scheme in some embodiments. The regenerate public key component 700 regenerates an OTS public key from an OTS signature and a message. If the regenerated OTS public key matches the published OTS public key (or h(OTS public key) if the hash was published), then the signature is verified. The component is passed an indication of the message and an OTS signature. In block 701, the component generates a hash (hmsg[ ]) of the message. In block 702, the component initializes an index i for indexing through the bits of the hash. In blocks 703-707, the component loops, generating a concatenation (pk) of all the values of the OTS public key (OTS.pub[n, b]) based on the value of the hash of the message and the OTS metadata of the OTS signature. In decision block 703, if the value of the indexed bit of the hash of the message is 0, then the component continues at block 704, else the component continues at block 705. In block 704, the component concatenates to the concatenation of the values (pk) a hash of the value of the OTS signature for the indexed bit and the OTS metadata for the indexed bit (smd.pub[i]). In block 705, the component concatenates to the concatenation of the values (pk) for the indexed bit the OTS metadata for the indexed bit (smd.pub[i]) and a hash of the value of the OTS signature for the indexed bit. In block 706, the component increments the index. In decision block 707, if the index is equal to the number of bits in the hash of the message, then the component generates a hash of the concatenation (h(pk)) as the regenerated OTS hash public key and completes, else the component loops to block 703.

Figure 8:
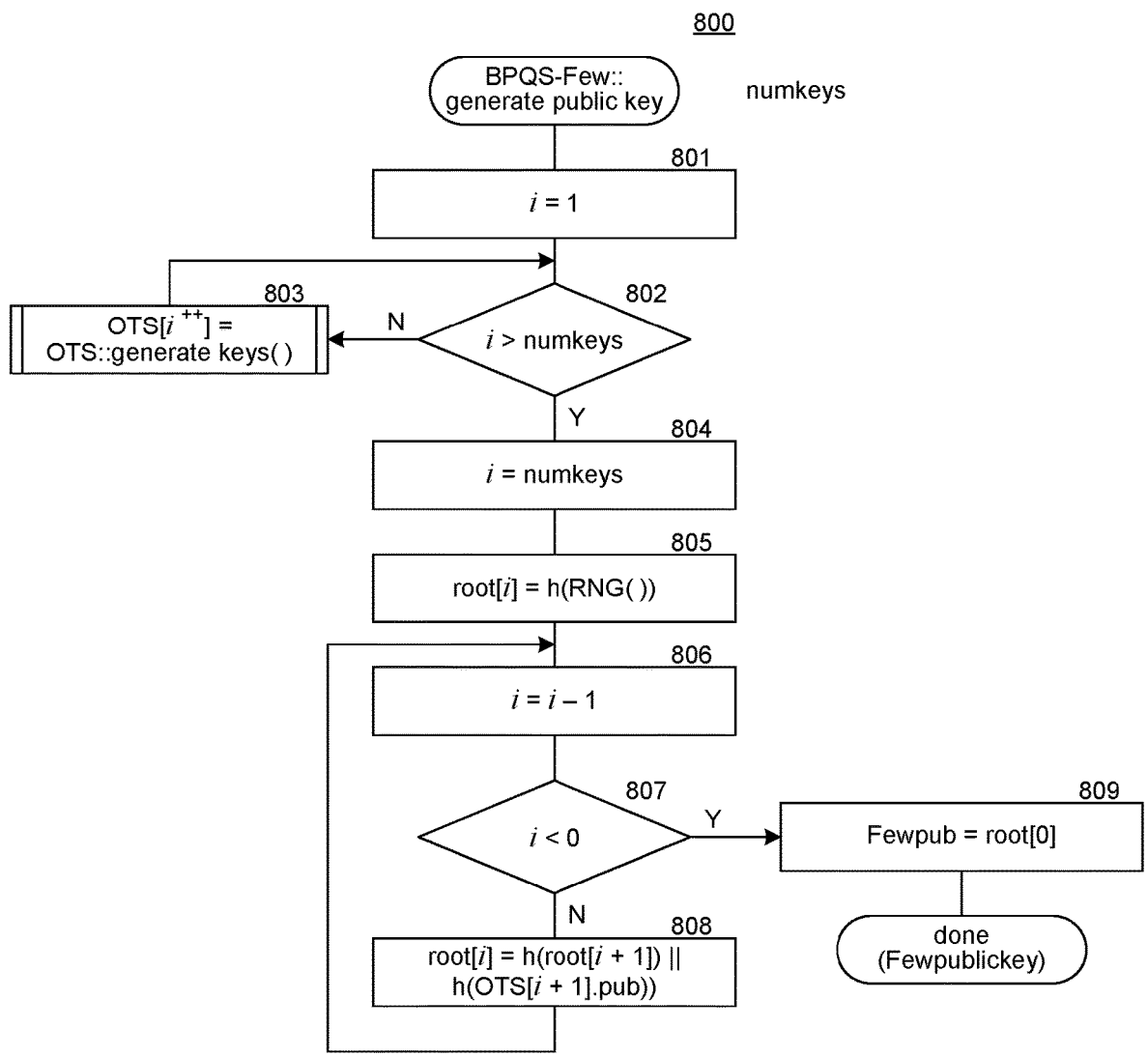
FIG. 8 is a flow diagram that illustrates the processing of a generate public key component of the BPQS-Few scheme in some embodiments.
Figure 9:
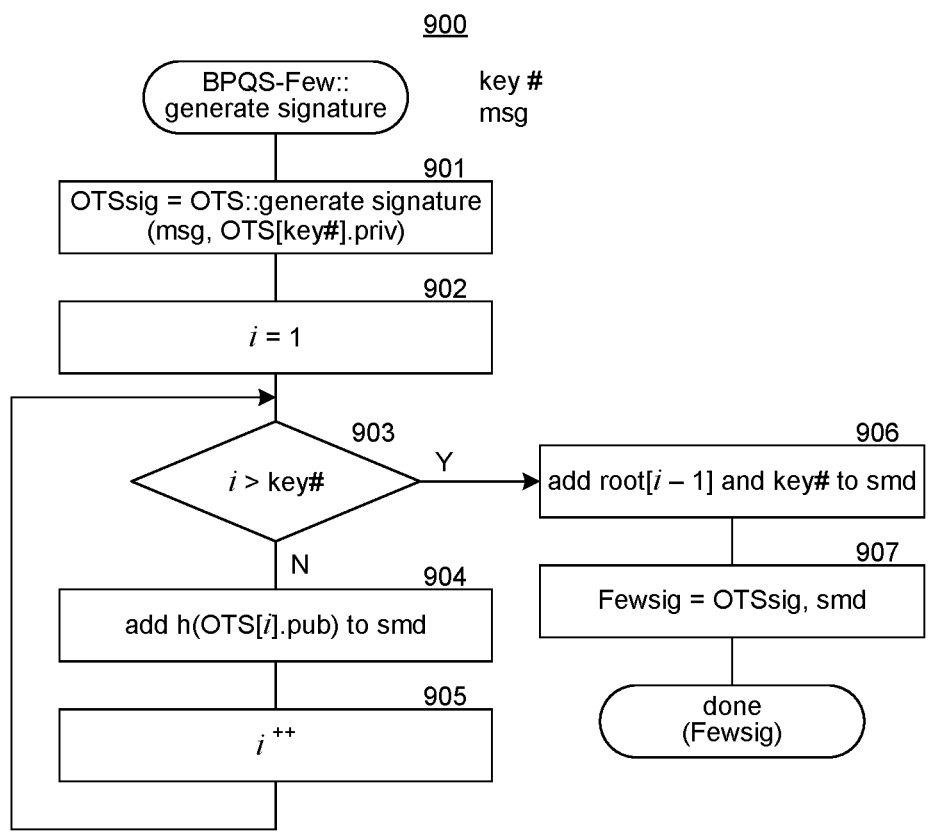
FIG. 9 is a flow diagram that illustrates the processing of a generate signature component of the BPQS-Few scheme in some embodiments.
Figure 10:
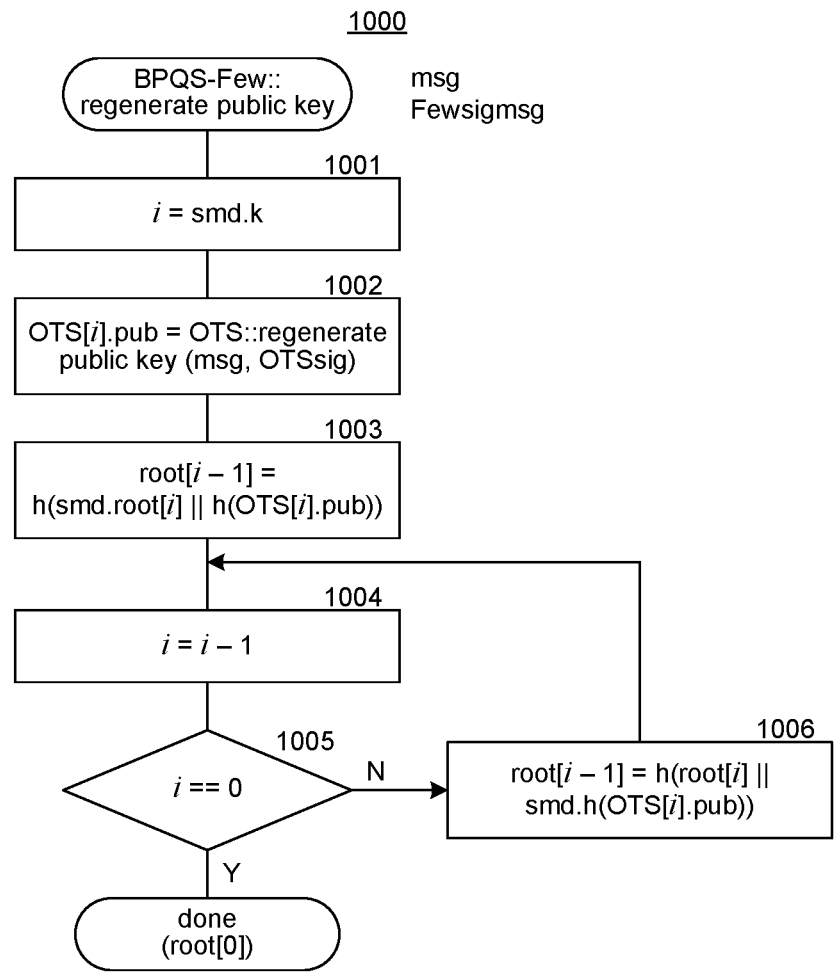
FIG. 10 is a flow diagram that illustrates the processing of a regenerate public key component of the BPQS-Few scheme in some embodiments.

FIGS. 8-10 are flow diagrams that illustrate the processing of the BPQS-Few scheme in some embodiments. FIG. 8 is a flow diagram that illustrates the processing of a generate public key component of the BPQS-Few scheme in some embodiments. The generate public key component 800 is passed an indication of the number of OTS key pairs to generate for the BPQS-Few scheme. In blocks 801-803, the component loops, generating the designated number of OTS key pairs. In block 801, the component initializes an index i for indexing through the number of OTS key pairs. In decision block 802, if the index is greater than the number of OTS key pairs, then the component continues at block 804, else the component continues at block 803. In block 803, the component invokes the generate keys component of the OTS scheme to generate an OTS key pair (OTS[i]), increments the index i, and loops to block 802. In block 804, the component initializes an index i to the number of keys. In block 805, the component sets the value of the indexed root (root[i]) of a hash tree to the hash of a randomly generated number, which is a seed. Root[i] corresponds, for example, to root[3] of FIG. 1. In blocks 806-808, the component loops, generating the values for higher-level roots of the hash trees. In block 806, the component decrements the index i to the next higher level root. In decision block 807, if the index is less than 0, then the value for root[0] has been generated and the component continues at block 809, else the component continues at block 808. In block 808, the component sets the indexed root to a hash of the concatenation of a root at the next lower level and the hash of the OTS public key for the next lower level and then loops to block 806 to set the index to the next higher level. In block 809, the component sets the Few public key to the value of the root node (root[0]) and then completes indicating the Few public key.

FIG. 9 is a flow diagram that illustrates the processing of a generate signature component of the BPQS-Few scheme in some embodiments. A generate signature component 900 is passed a key number and a message. The key number represents the next key of the BPQS-Few scheme that is to be used to generate the Few signature for the message. In block 901, the component invokes the generate signature component of the OTS scheme, passing an indication of the message and the OTS private key to be used to sign the message, and sets the OTS signature of the Few signature to the returned value. In blocks 902-905, the component loops, adding to the Few metadata of the Few signature hashes of OTS public keys at higher levels than the key number, which represent previously used OTS key pairs. In block 902, the component sets an index to the highest level. In decision block 903, if the index is greater than the key number, then all the hashes of OTS public keys have been added and the component continues at block 906, else the component continues at block 904. In block 904, the component adds the hash of the OTS public key at the indexed level to the Few metadata. In block 905, the component increments the index and loops to block 903. In block 906, the component adds the key number and the value of the root for the level represented by the index minus 1 to the Few metadata. The root[i−1] corresponds to, for example, root[2] of FIG. 1 when the key number is 2. In block 907, the component sets the Few signature to the OTS signature and the Few metadata. The component then completes indicating the Few signature.

FIG. 10 is a flow diagram that illustrates the processing of a regenerate public key component of the BPQS-Few scheme in some embodiments. The regenerate public key component 1000 is passed an indication of a message and a Few signature for the message and regenerates the Few public key. In block 1001, the component sets an index i to the key number of the Few metadata of the Few signature. In block 1002, the component invokes the regenerate signature component of the OTS scheme, passing an indication of the message and the OTS signature of the Few signature, and sets the indexed OTS public key to the returned value. In block 1003, the component sets the value for the root at the next higher level (root[i−1]) to a hash of the concatenation of the root (root[i]) in the Few metadata for the indexed level and a hash of the OTS public key at the indexed level. In blocks 1004-1006, the component loops generating higher-level roots of the hash trees. In block 1004, the component decrements the index i to point to the next higher-level hash tree. In decision block 1005, if the index equals 0, then the component completes indicating the value of root[0] as the regenerated Few public key, else the component loops to block 1006. In block 1006, the component sets the next higher-level root to the hash of a concatenation of the root at the indexed level and a hash of the OTS public key for the indexed level of Few metadata and loops to block 1004.

Figure 11:
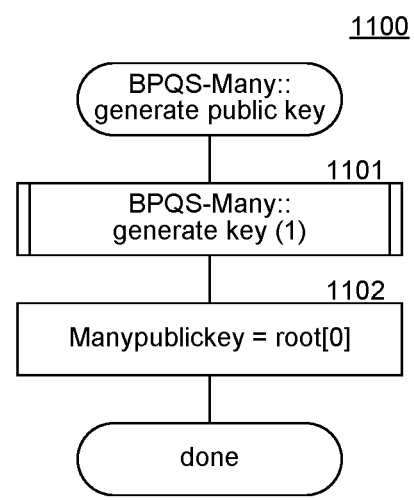
FIG. 11 is a flow diagram that illustrates the processing of a generate public key component of the BPQS-Many scheme in some embodiments.

FIGS. 11-14 are flow diagrams that illustrate the processing of components of a BPQS-Many scheme in some embodiments. FIG. 11 is a flow diagram that illustrates the processing of a generate public key component of the BPQS-Many scheme in some embodiments. The generate public key component 1100 generates a public key. In block 1101, the component invokes a generate key component of the BPQS-Many scheme, passing an indication that the key number is 1, to generate a first hash tree corresponding to, for example, nodes 201-203 of FIG. 2. In block 1102, the component sets a Many public key to the value of the root node of the Many Merkle tree and completes indicating the public key.

Figure 12:
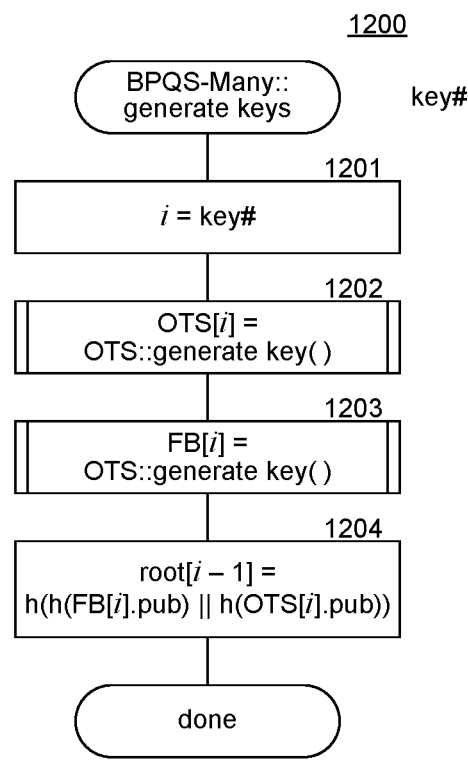
FIG. 12 is a flow diagram that illustrates the processing of a generate keys component of a BPQS-Many scheme in some embodiments.

FIG. 12 is a flow diagram that illustrates the processing of a generate keys component of a BPQS-Many scheme in some embodiments. The generate key component 1200 is invoked passing an indication of the key number of the pair of an OTS key pair and a fallback OTS key pair to be generated. In block 1201, the component sets an index i to the key number. In block 1202, the component invokes the generate key component of the OTS scheme to generate the OTS key pair for the key number. In block 1203, the component invokes the generate key component of the OTS scheme to generate the fallback OTS key pair for the key number. In block 1204, the component sets the value of the root for the next higher level to a hash of the concatenation of the hash of the combination of the fallback OTS public key at the indexed level and a hash of the OTS public key at the indexed level. The component then completes.

Figure 13:
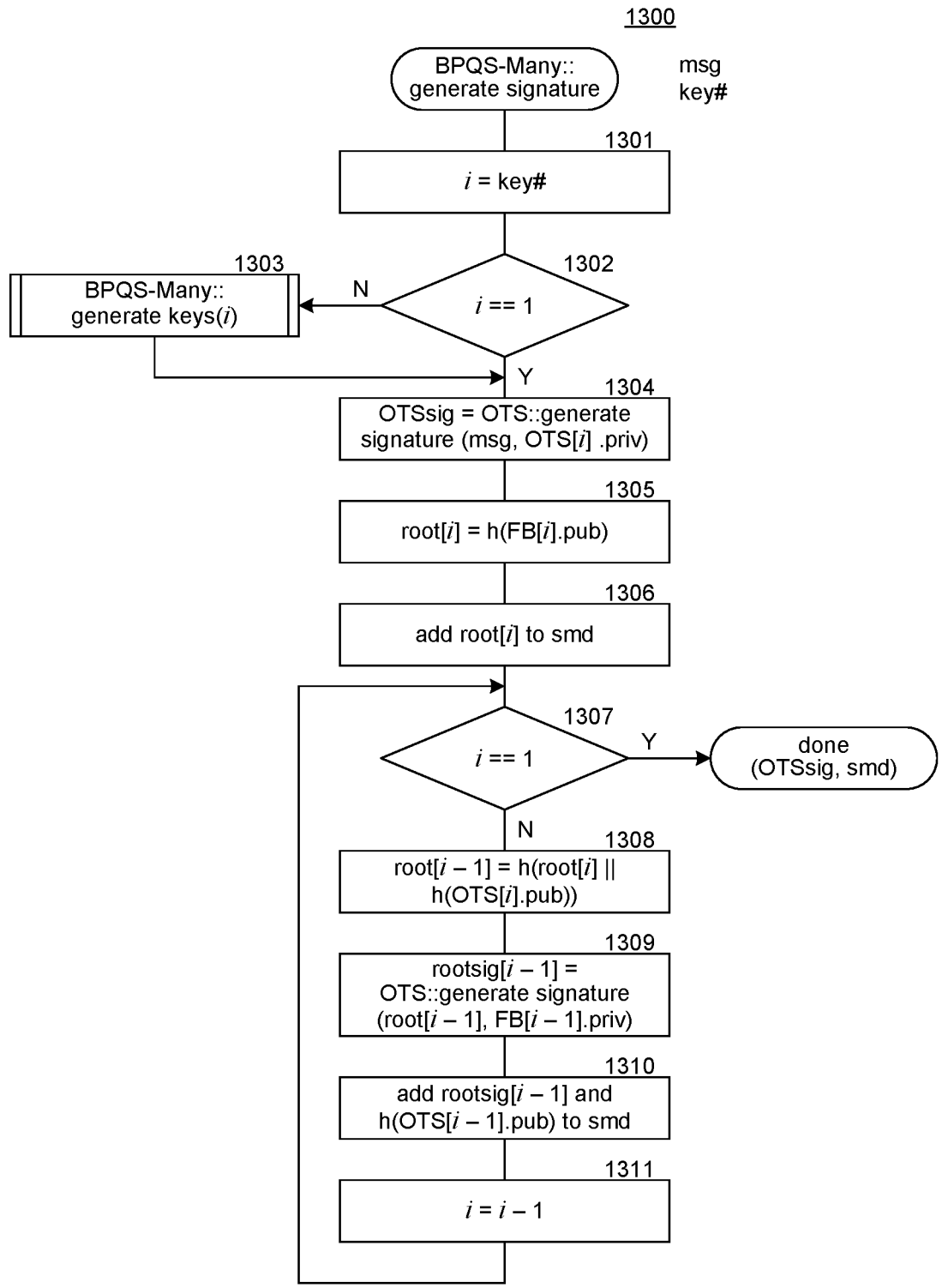
FIG. 13 is a flow diagram that illustrates the processing of a generate signature component of the BPQS-Many scheme in some embodiments.

FIG. 13 is a flow diagram that illustrates the processing of a generate signature component of the BPQS-Many scheme in some embodiments. The generate signature component 1300 is invoked passing an indication of a message and a key number to use for generating a Many signature for the message. In block 1301, the component sets an index i to the key number. In decision block 1302, if the index is equal to 1, then the keys have already been generated for the first level when generating the Many public key and the component continues at block 1304, else the component continues at block 1303. In block 1303, the component invokes the generate keys component of the BPQS-Many scheme to generate the fallback OTS key pairs and the OTS key pairs for the indexed level. In block 1304, the component invokes the generate signature component of the OTS scheme, passing an indication of the message and the OTS private key (OTS[i].priv) for the indexed level, to generate an OTS signature for the message. In block 1305, the component sets the value of the root at the indexed level to a hash of the fallback OTS public key for the indexed level. In block 1306, the component adds the value of the root at the indexed level to the Many metadata. In blocks 1307-1311, the component loops, generating the additional Many metadata. In decision block 1307, if the index is equal to 1, then the highest level has been reached and the component completes indicating the Many signature, which is a combination of the OTS signature and the Many metadata, else the component continues at block 1308. In block 1308, the component generates the value for the root of the next higher level. In block 1309, the component invokes the generate signature component of the OTS scheme passing an indication of the value of the root of the next higher level and the OTS private key of the fallback OTS key pairs for the next higher level and is returned a Root signature. In block 1310, the component adds to the Many metadata the Root signature for the next higher level and a hash of the OTS public key at the next higher level. In block 1311, the component decrements the index i and loops to block 1307.

Figure 14:
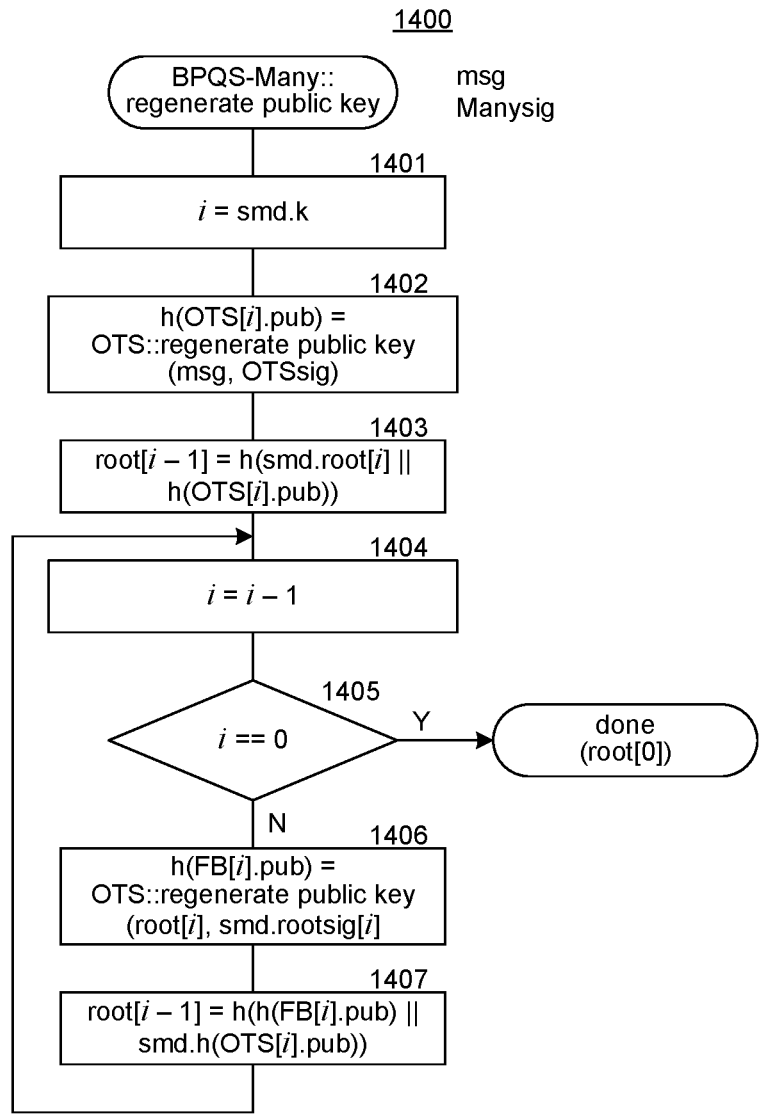
FIG. 14 is a flow diagram that illustrates the processing of a regenerate public key component of the BPQS-Many scheme in some embodiments.

FIG. 14 is a flow diagram that illustrates the processing of a regenerate public key component of the BPQS-Many scheme in some embodiments. The regenerate public key component 1400 is passed an indication of a message and Many signature for the message and regenerates the Many public key. In block 1401, the component sets an index i to the key number of the metadata of the Many signature. In block 1402, the component invokes a regenerate public key component of the OTS scheme, passing an indication of the message and the OTS signature of the Many signature, to generate the OTS public key for the indexed level. In block 1403, the component sets the root at the next higher level to a hash of the concatenation of the value of the root for the indexed level of the Many metadata and a hash of the OTS public key for the indexed level. In blocks 1404-1407, the component loops, generating the metadata. In block 1404, the component decrements the index i to point to the next higher level. In decision block 1405, if the index is equal to 0, then the root at the highest level has been reached and the component completes indicating the regenerated Many public key is the value of the root[0], else the component continues at block 1406. In block 1406, the component invokes the regenerate public key component of the OTS scheme, passing an indication of the value of the indexed root and the Root signature for the indexed level from the Many metadata, to regenerate the fallback OTS public key for the indexed level. In block 1407, the component sets the value of the root at the next higher level to a hash of the concatenation of the value of the regenerated fallback OTS public key and the hash of the OTS public key for the indexed level from the Many metadata and loops to block 1404 to process the next higher level.

Signatures on Linked Data Structures

In some embodiments, the BPQS system may be employed to sign blocks of transactions of a distributed ledger. A distributed ledger may employ a notary to sign a block of transactions as evidence of the transactions of the block that have been recorded in the distributed ledger. The notary may validate the transactions that are submitted to it and periodically group the validated transactions into blocks, sign the blocks, and publish the signed blocks. The notary may employ an BPQS-Many scheme to sign the blocks so that the signature of each block can be verified based on the same published Many public key of the notary. Alternatively, the notary may employ a BPQS-Few scheme or a BPQS-Combined scheme when signing the blocks.

Figure 15:
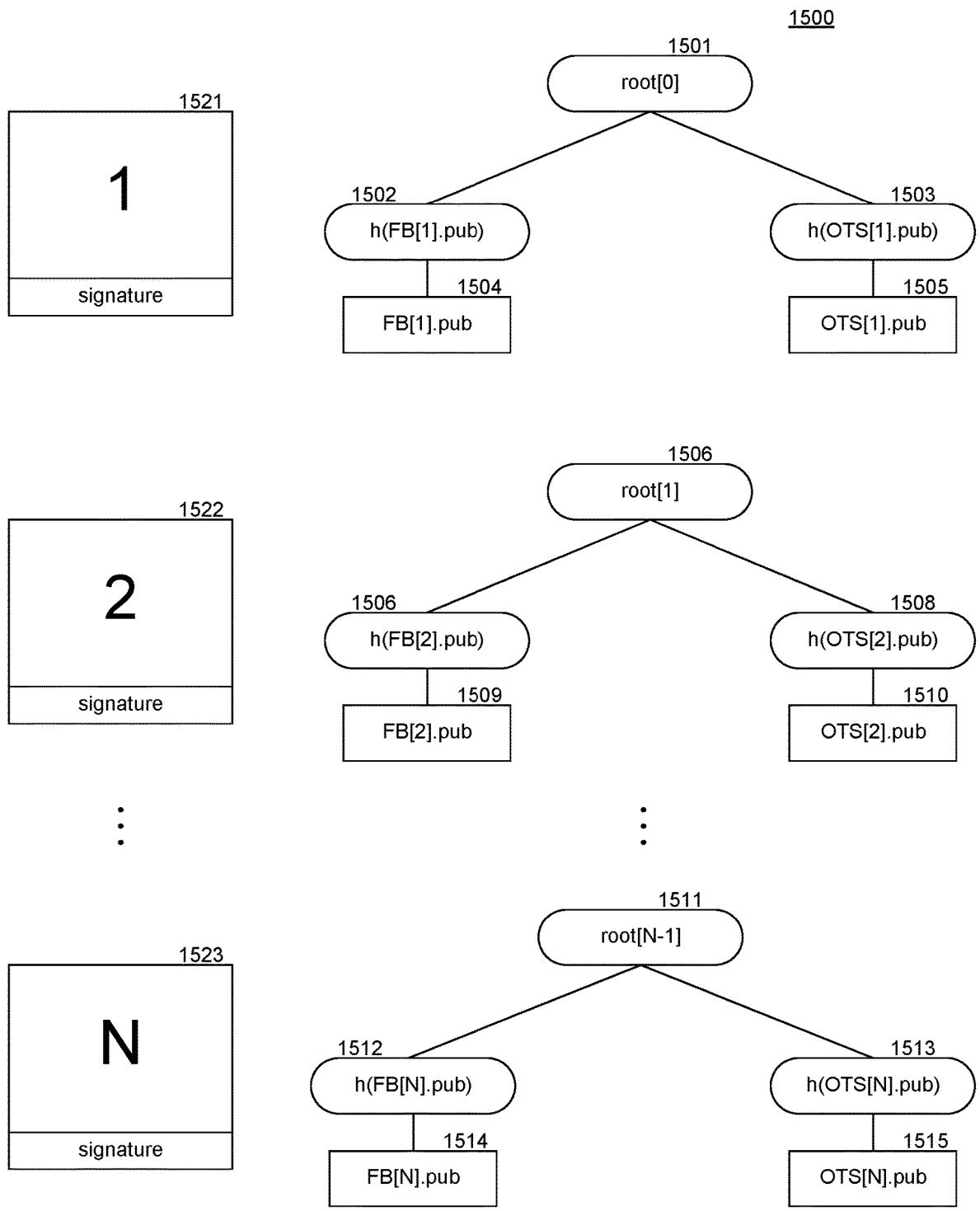
FIG. 15 is a diagram that illustrates use of a BPQS-Many scheme to sign blocks of a distributed ledger.

FIG. 15 is a diagram that illustrates use of a BPQS-Many scheme to sign blocks of a distributed ledger. The distributed ledger may include some number of blocks 1521-1523. Each block includes a signature that is based on the BPQS-Many scheme. The notary initially generates a Merkle tree with nodes 1501-1503 similar to the Merkle tree with nodes 201-203 of FIG. 2. The notary publishes root[0] as the Many public key of the notary for the distributed ledger. When the notary signs the first block 1521, the notary generates a Many signature with a hash of the content of the block as the message to be signed. The notary may store the Many signature with the block. A party may verify the Many signature by regenerating the Many public key and comparing it to the published Many public key. When the notary is to sign the second block 1522, the notary generates a Merkle tree with nodes 1506-1508 similar to the Merkle tree with nodes 206-208. The notary then generates a Many signature with a hash of the content of the block as the message to be signed and may store the signature with the block. A party may verify the Many signature by regenerating the public key and comparing it to the published Many public key.

Figure 16:
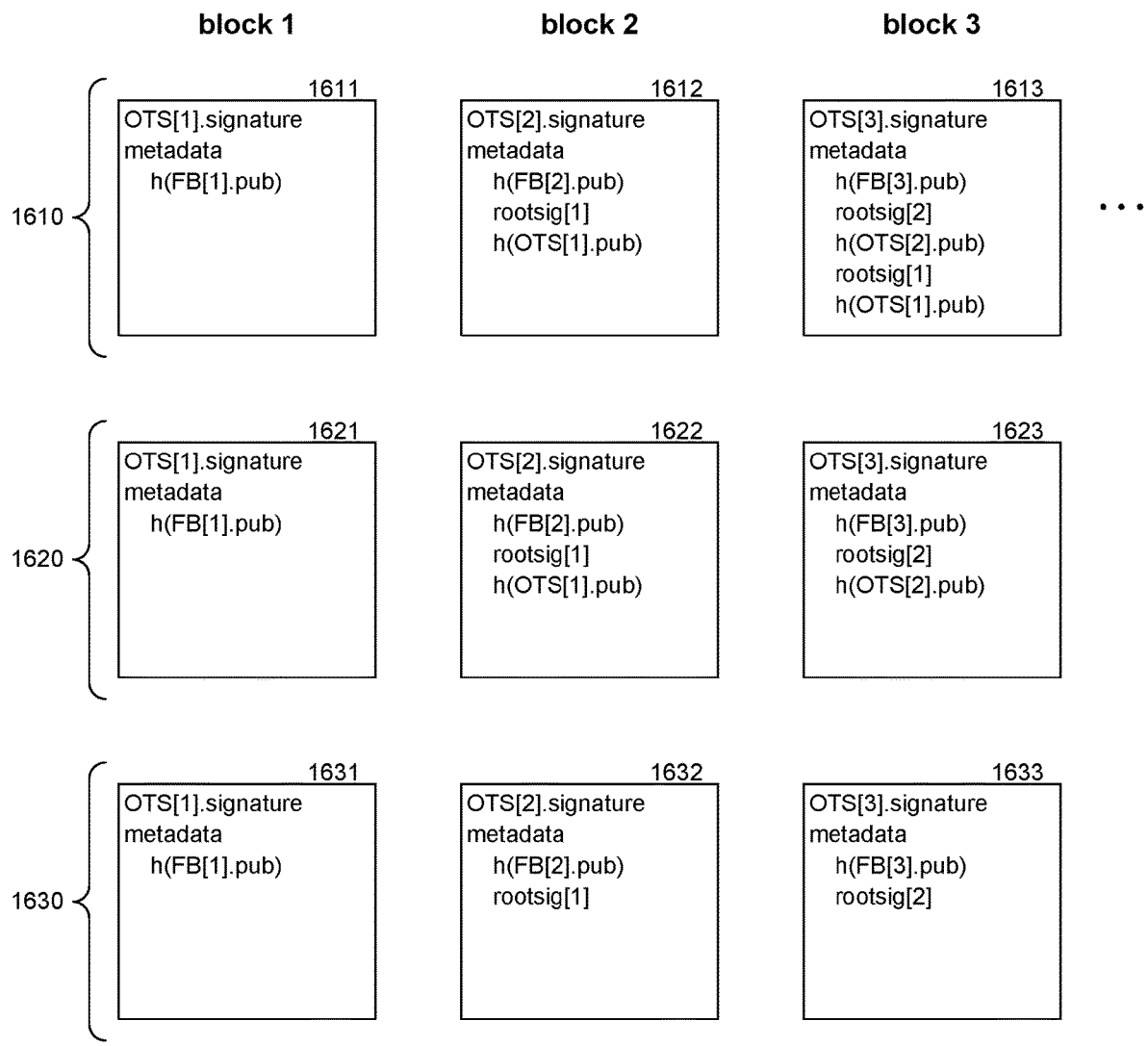
FIG. 16 illustrates techniques for storing metadata in blocks using a BPQS-Many scheme.

Since the signature of each block contains sufficient information to regenerate the root of the Merkle tree that was created for that block, the BPQS system may not store a complete Many signature in each block, but rather may rely on Many metadata of the Many signatures of the prior blocks in the chain which would otherwise be stored redundantly with each block. FIG. 16 illustrates techniques for storing Many metadata in blocks using a BPQS-Many scheme. Distributed ledger 1610 includes Many signatures 1611, 1612, and 1613 for the first three blocks. Each signature includes sufficient information to verify the published Many public key of root[0]. Each block that is added includes a Many signature that is longer than the signature of the prior block. Each block includes one more fallback OTS signature (rootsig[ ]) for the root of the Merkle tree created for the block and one more hash of an OTS public key of the prior block (h(OTS[ ].pub)). As a result, the Many signatures increase in size with the block number.

In some embodiments, since the Many metadata of the signatures of the prior blocks (except for the first) includes the fallback OTS signature for the root of the Merkle tree of that prior block and the hash of the OTS public key of its prior block, the Many signature for a block need not duplicate the portion of Many metadata that is included in a prior block. To verify a Many signature for a block, the verifier can retrieve the additional Many metadata needed to verify the Many signature from the prior block. Distributed ledger 1620 includes Many signatures 1621-1623 that do not include redundant Many metadata. For example, Many signature 1623 does not include fallback OTS signature for the root[1] (rootsig[1]) and the hash of the OTS public key of the first Merkle tree (h(OTS[1].pub)).

In some embodiments, if a verifier has already verified the Many signature of each prior block, the verifier need only verify that the signature of the current block can be used to generate the hash of the fallback OTS public key in the Many signature of the prior block. If the correct hash is generated, then the verifier has already verified that the published Many public key of the notary can be generated from the signatures of the prior blocks. Distributed ledger 1630 includes Many signatures 1631-1633 with the Many metadata that is needed to perform the verification assuming the signatures of the prior blocks have already been verified. A verifier who has not yet verified the Many signatures of any blocks can do so starting with the first block. To verify the Many signature of block 1633, the verifier uses the Many signature of block 1633 (OTS[3].signature) to regenerate the OTS public key (OTS[3].pub) from the content of the block. The verifier then generates a value for root[2] that is a hash of a concatenation of the hash of the fallback OTS public key (h(FB[3].pub)) and a hash of the generated OTS public key (h(OTS[3].pub)). The verifier then uses the fallback OTS signature for root[2] to generate the fallback OTS public key for the prior block (FB[2].pub) and compares a hash of that generated fallback OTS public key to the hash of the fallback OTS public key of the Many metadata of the Many signature for block 1632. If they match, then the Many signature is verified.

Figure 17:
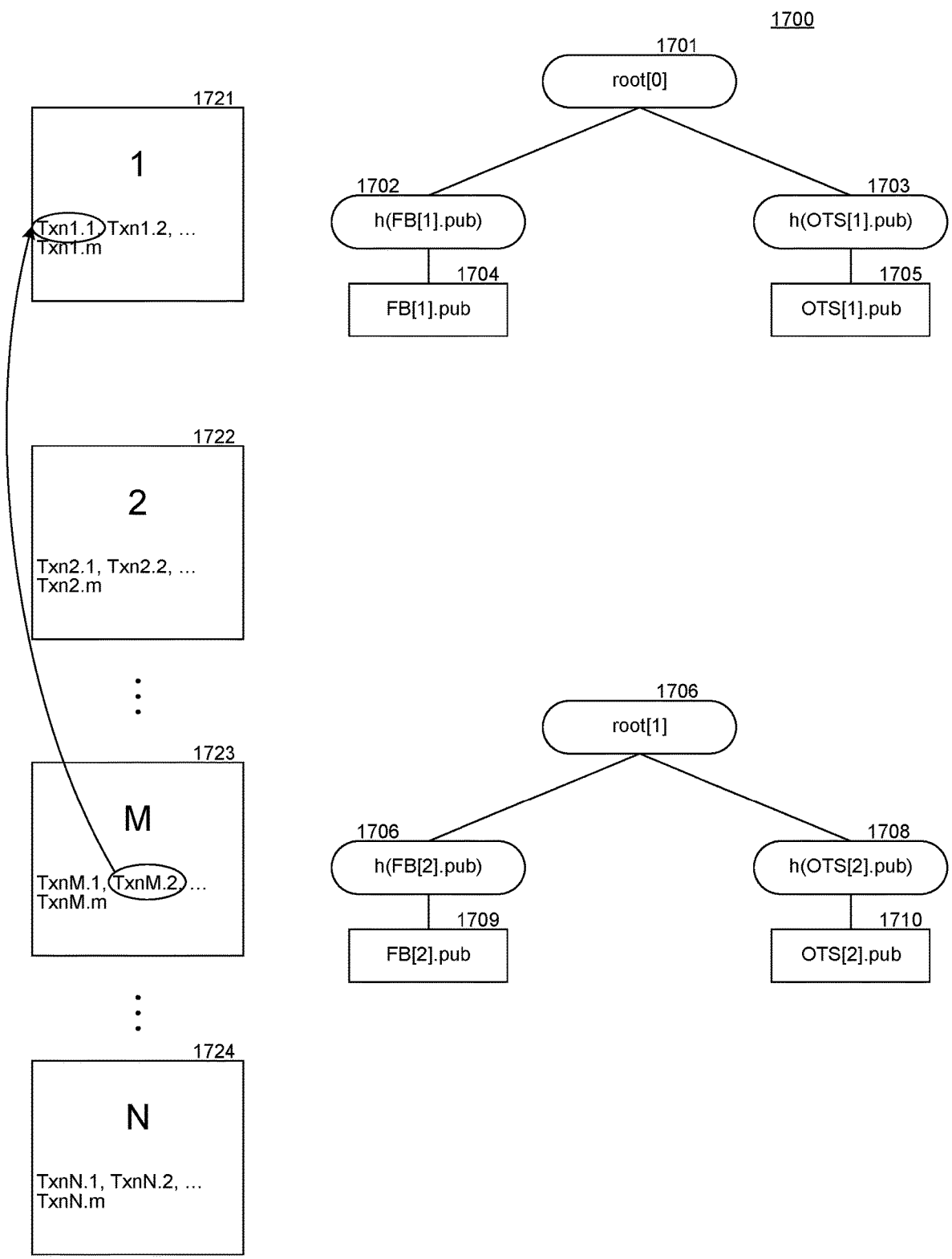
FIG. 17 illustrates transactions of a distributed ledger signed with a variation of the BPQS-Block scheme.

A variation of the BPQS-Block scheme may be used to sign transactions that are stored in a distributed ledger or otherwise linked together. More generally, this variation can be used with any type of data in which instances of the data (e.g., transactions or records) have a path to a root instance that can be identified. For example, a list of the identifiers of the instances along the path can be maintained for identification of the path. FIG. 17 illustrates transactions of a distributed ledger signed with a variation of the BPQS-Block scheme. When an entity is to sign multiple transactions that can be verified using the same published Many public key, the entity generates a Many signature with Many metadata as described in reference to distributed ledgers 1610, 1620, or 1630. The metadata, however, also needs to include a reference to its immediately prior transaction signed for the same published Many public key. The Many metadata of the Many signatures of distributed ledgers 1610, 1620, or 1630 did not need to include an explicit reference to the prior block because, for example, the block itself may contain an explicit reference to the prior block or the reference may be implicit based on the block number. In this example, transaction TxnM.2 of block 1723 includes a Many signature with Many metadata corresponding to that of Many signature 1632 along with a reference (e.g., Txn1.1) to the immediately prior transaction that was signed for the same published Many public key. If the verifier has already verified the prior transaction, then the verifier need only use Man metadata of the Many signature of the current transaction and of the prior transaction to verify the Many signature of the current block.

Figure 18:
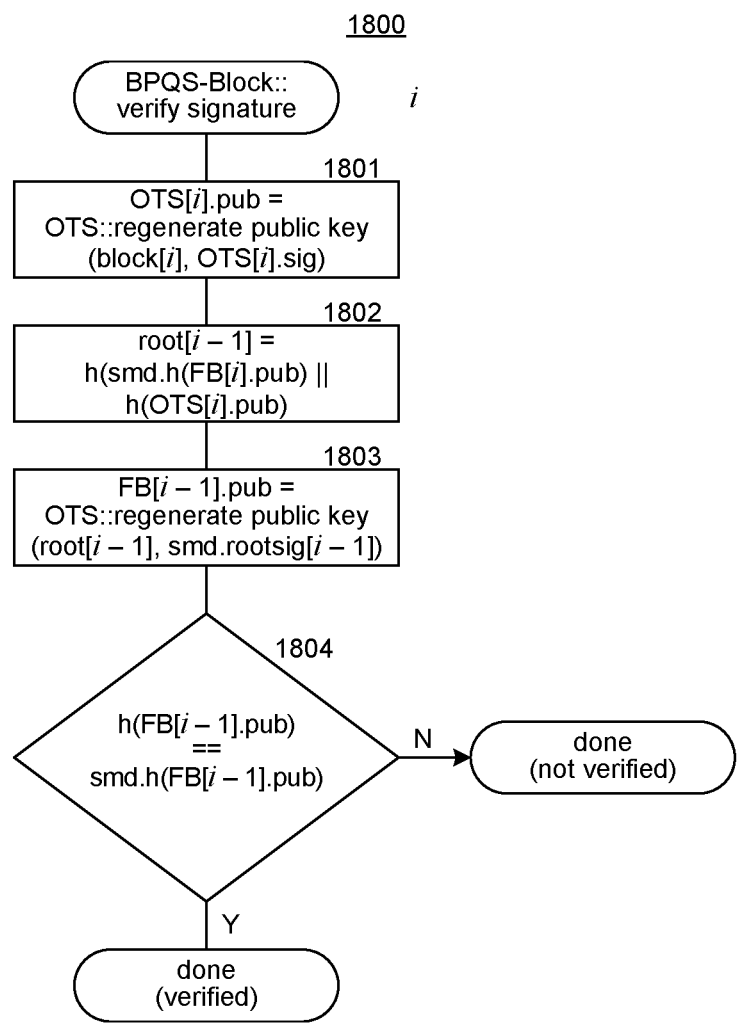
FIG. 18 is a flow diagram that illustrates the processing of a regenerate public key component of the BPQS-Block scheme in some embodiments.

FIG. 18 is a flow diagram that illustrates the processing of a regenerate public key component of the BPQS-Block scheme in some embodiments. The regenerate public key component 1800 is passed an indication of a block i and verifies that the Many signature of the block (Manysig[i]) can be used to generate a hash of the fallback OTS public key of the prior block (h(FB[i−1].pub)). In block 1801, the component invokes a regenerate public key component of the OTS scheme the block as the content and the OTS signature of the Many signature of the block to generate the OTS public key (OTS[i].pub) for the block. In block 1802, the component generates the root (root[i−1]) for the next prior block as a hash of the concatenation of the value of the fallback OTS public key of the Many metadata for the Many signature of the block (smd.h(FB[i].pub) and a hash of the OTS public key for the block (h(OTS[i].pub)). In block 1803, the component regenerates the fallback OTS public key for the Many signature of the prior block by invoking the regenerate public key component of the OTS scheme passing an indication of the value of the generated root for the next prior block (root[i−1]) and the root signature from the Many metadata of the block (smd.rootsig[i−1]). In decision block 1804, if a hash of the regenerated fallback OTS public key (h(FB[i−1].pub)) matches the passed hash of the fallback OTS public key of the prior block (smd.h (FB[i−1].publ), then the component completes indicating that the signature was verified, else the component completes indicating that the signature was not verified.

When the signatures of data previously generated using an OTS key pair are used to generate a public key using a BPQS-Few scheme, a BPQS-Many scheme, or a BPQS-Combined scheme are available, then subsequent signatures need not include metadata that was already included in the previous signature. Thus, the techniques can be used for signing arbitrary content and need not be limited to signing linked data structure. In addition, the BPQS-Combined scheme can be used to sign blocks of a distributed ledger and linked data structures as described above.

Faster Signature Verification

In some applications, the computational resources (e.g., amount of storage and processing power) needed to verify signatures can significantly impact the overall performance of the applications. For example, in the case of the Corda system transactions are submitted to a notary for notarization prior to recoding in a distributed ledger. As part of the notarization process, the notary verifies the signatures of the parties to each transaction to be notarized. This verification process may be a limiting factor on how many transactions can be notarized by a notary. In some embodiments, a BPQS system includes techniques to reduce the time needed when verifying a signature. With one technique, the BPQS system employs a tradeoff between computational resources required at signature generation time and signature verification time. To support this tradeoff, the BPQS system specifies characteristics of the hash of the content that is to be signed. For example, a characteristic may be that the hash is to include a certain pattern such as some number of leading or trailing zeros, a certain pattern of 1s and 0s in the middle of the hash, and so on. Another characteristic may be that the hash has at least a certain number of 1s. To generate the hash of content with the specified characteristic, a nonce is identified that results in the hash of the combination of the content and the nonce having the specified characteristic. To identify the nonce, the signer may repeatedly generate different nonces (e.g., by incrementing the prior nonce) and checking whether the hash of the combination of the content and the new nonce has the specified characteristic until the nonce is identified. The BPQS system may publish the specified characteristic as a requirement so that signers will generate hashes of content that satisfy the requirement.

When the characteristic is a pattern, the signer generates the signature based on only the portion of the hash that is not part of the pattern. For example, if the hash is 256 bits and the pattern is that the hash has 32 leading 0s, then the signature is based on the 224 bits (non-pattern bits) following the 32 leading 0s (pattern bits). When generating signatures based on a hash that has a specified pattern, the signer may generate a key pair based only on the non-pattern bits. Continuing with the example, with a Lamport OTS scheme, the BPQS system may generate only 224 private key pairs. The public key would be derived from a hash of each of the 448 private keys such as a hash of a combination of the hashes of each private key. The signature would include one private key from each of the 224 private key pairs depending on the value of the corresponding bit of the non-pattern bits and would include the nonce as metadata. The signature may also include a hash of the other private key of each private key pair, which corresponds to one half of the public key and need not be included in the signature if all the public keys are published. The signer may also use an existing component to generate 256 key pairs and extract the 224 private key pairs from those 256 key pairs.

To verify the signature, the verifier would generate a hash of the combination of the content and the nonce of the signature. The verifier may also check whether the hash contains the pattern and indicate that the signature is not verified if it does not. The verifier would then generate a hash of each private key of the signature. The verifier would then combine the generated hashes of the private keys with the corresponding public keys in an order based on the values of the corresponding non-pattern bits of the hash of the combination of the content and the nonce. If the combination of the hashes of the private keys and the corresponding public keys can be used to generate the published public key, then the signature is verified. Continuing with the example, the verifier avoids having to generate a hash for each of the 32 bits of the pattern. As a result, the processing power needed to verify a signature are reduced, for example, because of the over 10% reduction in the number of hashes of private keys that need to be performed. The storage requirements are similarly reduced. The computational resources used by the signer would increase, however, because of the process of identifying the nonce that results in the desired pattern.

When the characteristic is a minimum number of 1s and a Winternitz-based OTS scheme is employed, then the computational resources needed to verify a signature can be reduced. The key pairs are generated as conventionally done for a Winternitz-based OTS scheme. To generate a signature, the signer identifies a nonce that results in a hash of combination of the content and the nonce with the minimum number of 1s (e.g., more than half of the number of bits in the hash). The signer generates the signature based on the hash as is done conventionally but includes the nonce as part of the signature (e.g., as metadata). Because of the large number of 1s in the hash of the combination of the content and the nonce is likely greater than the number of 1s in a hash of just the content, the units of bits of the hash (e.g., 4-bit units) will likely have bit-values (0-15) that are larger. As a result, the signer will need to generate at least some longer chains of hashes to encode the larger bit values. For example, if the hash of the content would have had a unit with bits 0101, the chain would have six hashes. But, if the hash of the combination of the content and nonce, the same unit has the bits 1101, then the chain would have 14 hashes. Thus, the generating of the signatures will consume more computational resources. However, the verifying of the signatures will consume less computational resources. The verifier first generates a hash of the content and the nonce so that the hash has the minimum number of 1s. The verifier then verifies the signature on the generated hash as done conventionally. However, since the chain of hashes represented by the signature are likely longer than without use of the nonce, the verifier needs to perform fewer hashes to complete each chain and verify the signature. Continuing with the example, to verify the signature for bits 1101, then the verifier need only perform three hashes. In contrast, with the original bits 0101, the verifier would need to perform 11 hashes. If a hash of the content and a nonce has the minimum number of 1s, then a nonce need not be generated and the metadata may specify that a nonce was not used.

Figure 19:
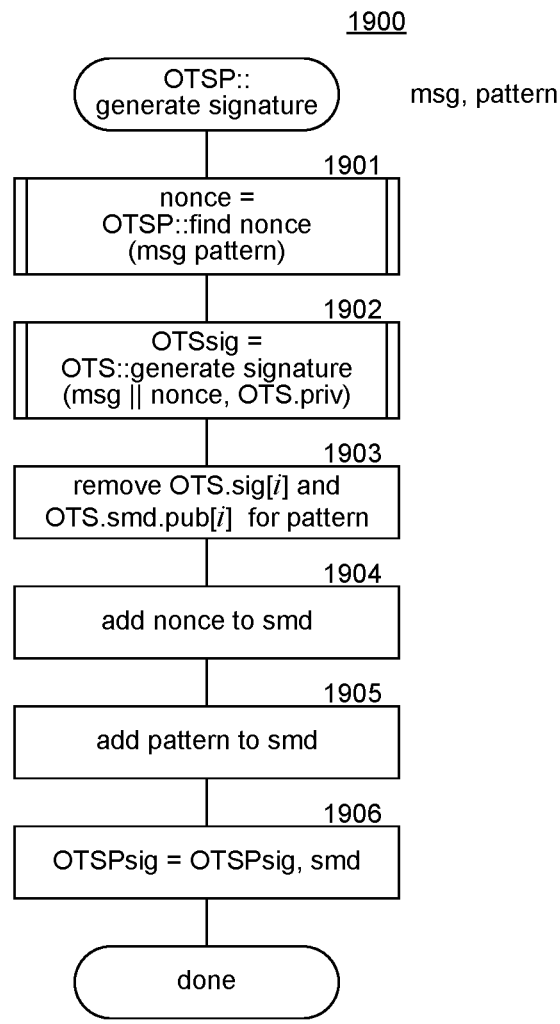
FIG. 19 is a flow diagram that illustrates processing of a generate signature component of an OTS scheme based on pattern ("OTSP") of the BPQS system in some embodiments.

FIG. 19 is a flow diagram that illustrates processing of a generate signature component of an OTS scheme based on pattern ("OTSP") of the BPQS system in some embodiments. The generate signature component 1900 is invoked to generate a signature for an OTS scheme based on a pattern. The component is passed the message to be signed and the pattern. As described herein, the key pairs may be generated by using an adaptation of the generate key component of the OTS scheme. The generate key component may be adapted to generate a key pair based only on the non-pattern bits. Alternatively, the generate key component without adaptation can be used followed by extracting the number of private key pairs and public key pairs as needed for the non-pattern bits. In block 1901, the component invokes a find nonce component passing an indication of the message and the pattern to identify a nonce in which a hash of the combination of the message and the nonce has the pattern. In block 1902, the component invokes a generate signature component of the OTS scheme that has not been adapted passing a combination of the message and the nonce and an OTS private key for generating the signature. In block 1903, the component removes the OTS.priv[i] and OTS.smd.pub[i] for each pattern bit. Alternatively, an adaptation of the generate signature component of the OTS scheme may be developed to generate a signature based on only the non-pattern bits. In block 1904, the component adds the nonce as metadata of the signature. In block 1905, the component adds an indication of the pattern (e.g., 32 leading 0s) as metadata of the signature. Alternatively, this indication need not be added if the verifier has other means of identifying the pattern (e.g., established by a protocol). In block 1906, the component combines the OTS signature and the metadata to form an OTSP signature ("OTSPsig") and completes indicating the OTS pattern signature.

Figure 20:
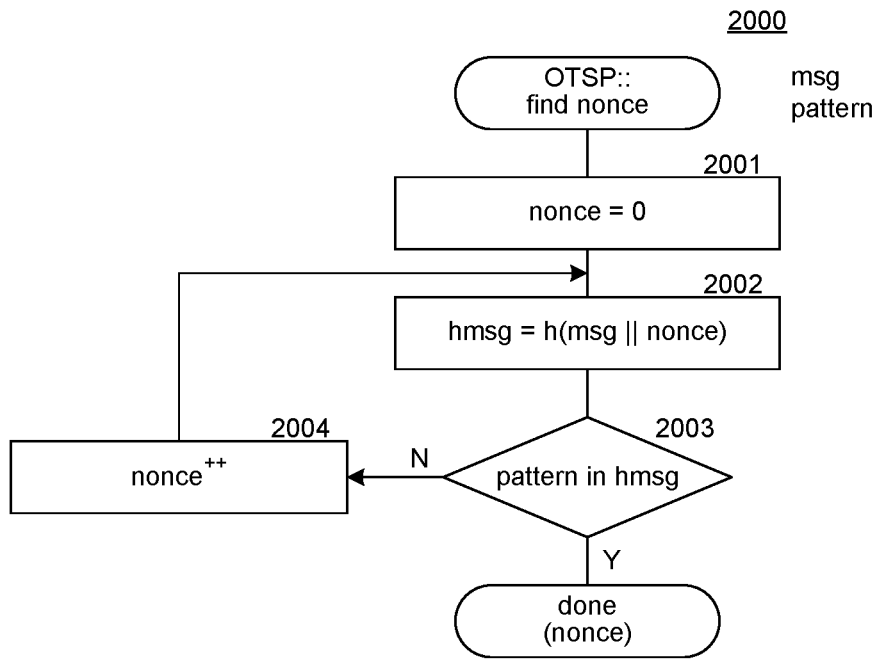
FIG. 20 is a flow diagram that illustrates the processing of a find nonce component of the OTSP scheme of the BPQS system in some embodiments.

FIG. 20 is a flow diagram that illustrates the processing of a find nonce component of the OTSP scheme of the BPQS system in some embodiments. The find nonce component 2000 is invoked passing an indication of the message and the pattern and identifies a nonce that results in hash of the message and the nonce that has the pattern. In block 2001, the component initializes the nonce to zero. In block 2002, the component generates a hash of the combination of the message and the nonce. In decision block 2003, if the hash of the message and the nonce has the pattern, then the component completes indicating the nonce, else the component continues at block 2004. In block 2004, the component increments the nonce and loops to block 2002.

Figure 21:
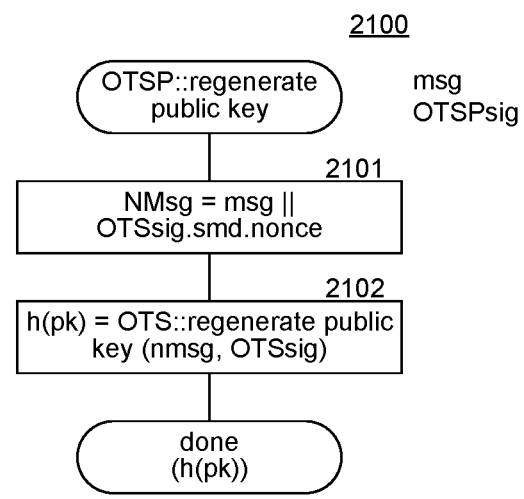
FIG. 21 is a flow diagram that illustrates processing of a regenerate public key component of an OTSP scheme based on a pattern of the BPQS system in some embodiments.

FIG. 21 is a flow diagram that illustrates processing of a regenerate public key component of an OTSP scheme based on a pattern of the BPQS system in some embodiments. The regenerate public key component 2100 is invoked passing an indication of a message and an OTSP signature and generates a hash of the public key pairs corresponding to the private key pairs used to sign the message. In block 2101, the component generates a combined message that is combination of the passed message and nonce of the metadata of the OTSP signature. In block 2102, the component invokes the regenerate public key component of the OTS scheme passing an indication of the combination of the message and the nonce and the OTS signature of the OTSP signature. The component receives the hash of the public key pairs in return. The component then completes indicating the hash of the public key pairs.

Figure 22:
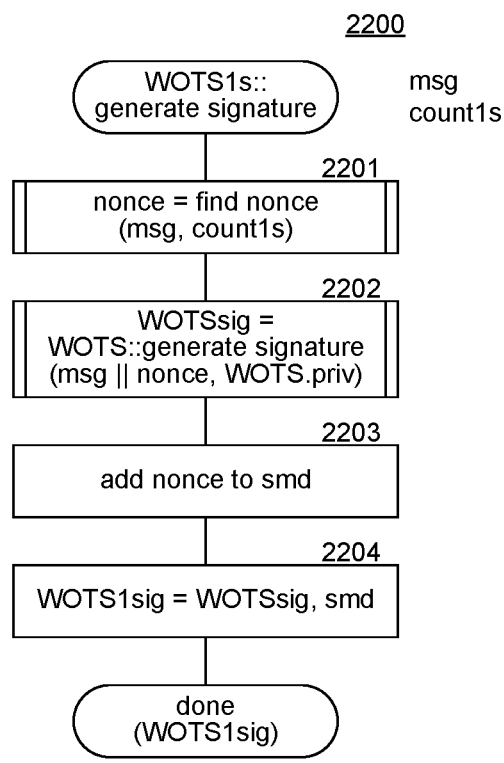
FIG. 22 is a flow diagram that illustrates the processing of a generate signature component of an WOTS 1s ("WOTS1") scheme of the BPQS system in some embodiments.

FIG. 22 is a flow diagram that illustrates processing of a generate signature component of an WOTS 1s ("WOTS1") scheme of the BPQS system in some embodiments. The generate signature component 2200 is invoked passing an indication of a message and a count of 1s that are to be included in the signature. In block 2201, the component invokes the find nonce component to find a nonce that results in a hash of the message and the nonce with at least the count number of 1s. In block 2202, the component invokes a generate signature component of a WOTS scheme passing an indication of the combination of the message and the nonce and passing the WOTS private keys (WOTS.priv) and receives in return a WOTS signature (WOTSsig). Although not illustrated in a diagram, the generate signature component of the WOTS scheme generates hashes the WOTS private keys for a unit a number of times based on based on the bit-value of the unit. A hash of the corresponding WOTS public keys (e.g., generated by hashing each OTS private key 16 times) was already generated and published. In block 2203, the component adds the nonce to the metadata of the signature. In block 2204, the component generates a WOTS1 signature (WOTS1sig) that includes the WOTS signature and the nonce. The component then completes indicating the WOTS1 signature.

Caching a WOTS Hash Chain

In some embodiments, the BPQS system caches at least some of the hashes of the chain of hashes used to generate the WOTS public keys from WOTS private keys. When the WOTS private keys are subsequently used to generate a signature for a message, the cache can be used to speed up the process of generating the hashes as the process can start from a cached hash, rather the WOTS private keys. A WOTS scheme may divide the hash of messages to be signed into a number of units of multiple bits. For example, a 256-bit hash may be divided into 64 units of 4 bits each with a bit-value of 0-15. The WOTS public key corresponding to each unit is the result of a chain of 16 hashes of the WOTS private key for that unit. The BPQS system may cache, for example, the hashes of the chain at certain intervals. If the interval is 4, then the BPQS system would cache the hashes corresponding to bit-values of 0, 4, 8, and 12.

A signer signs a message by first retrieving the hashes in the cache for the bit-values that are just lower than the bit-value of each unit of the message. For example, if the bit value of a unit is 6, then the cached hash for the interval 4 of the WOTS private key for that unit is retrieved. The signer then performs additional hashing to reach a chain that is equal to the length of the bit-value plus one. In this example, the signer performs only two hashes rather than seven that would be required if starting from the WOTS private key for the unit. Because the signer does not need to start each chain from the WOTS private key, the signer can sign the message more quickly. The storage requirements, however, would increase as a result of caching the hashes.

Figure 23:
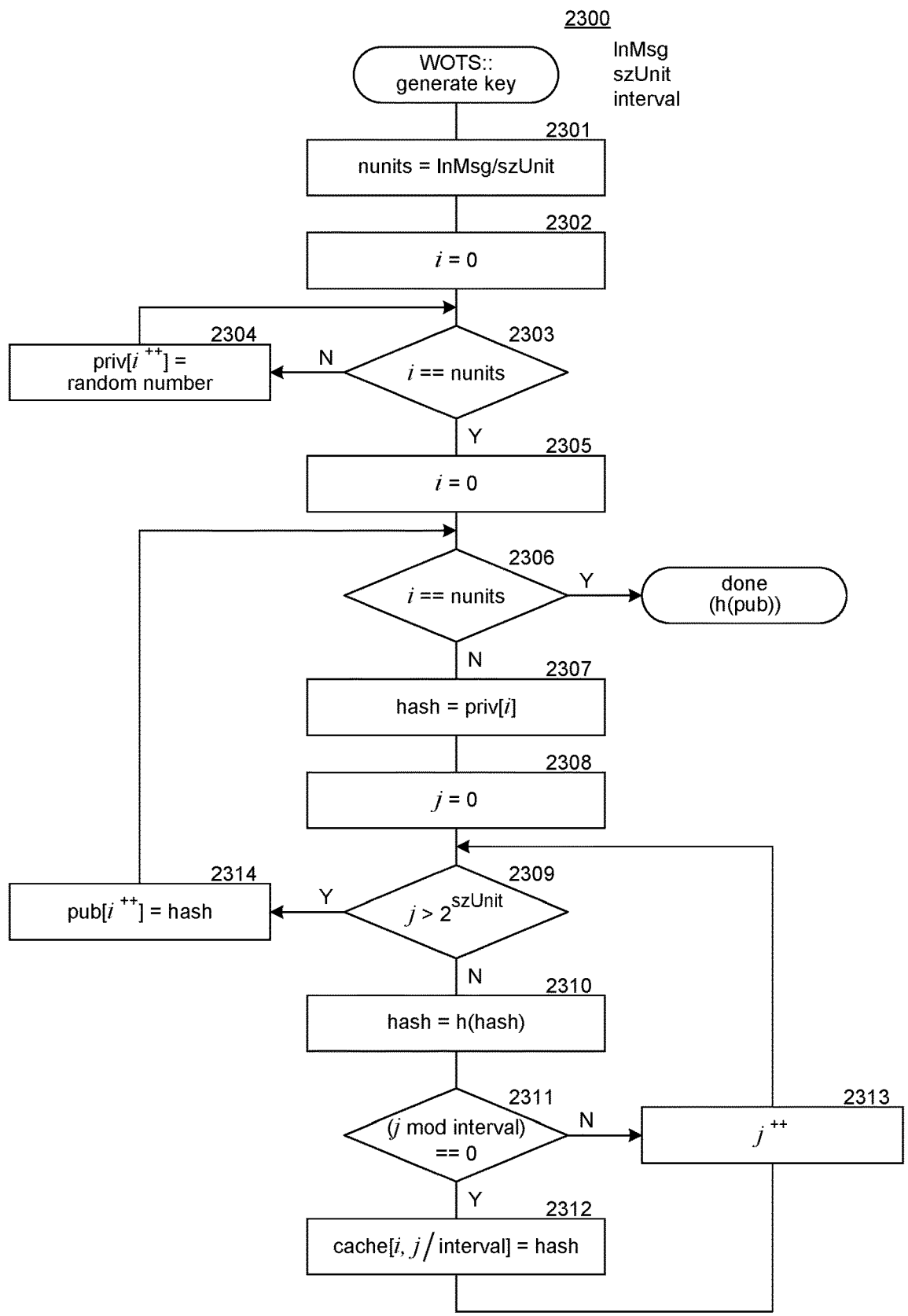
FIG. 23 is a flow diagram that illustrates the processing of the generate key component with caching of a WOTS scheme of the BPQS system in some embodiments.

FIG. 23 is a flow diagram that illustrates the processing of the generate key component with caching of a WOTS scheme of the BPQS system in some embodiments. The component is passed an indication of the length of the message (InMsg) to be signed using the key, the size of each unit of the message (szUnit) (e.g., 4 bits), and a caching interval. The caching interval indicates the distance between hashes of the WOTS private key that are to be cached. For example, an interval of 2 indicates that every second hash is to be cached, and an interval of 4 indicates that every fourth hash is to be cached. In block 2301, the component calculates the number of units in the message assuming the number of bits of the message is an even multiple of the number of bits in a unit. In blocks 2302-2304, the component loops generating the WOTS private keys. In block 2302, the component initializes an index i into the WOTS private keys. In decision block 2303, if the index i is equal to the number of units, then the generation of the WOTS private keys is complete and the component continues at block 2305, else the component continues at block 2304. In block 2304, the component sets the indexed WOTS private key to a randomly generated number, increments the index, and loops to block 2303. In block 2305, the component initializes an index i into the WOTS private keys. In decision block 2306, if the index i is greater than the number of units, then the component completes indicating a hash of the WOTS public keys as the published public key, else the component continues at block 2307. In block 2307, the component initializes the first value in the chain to the WOTS private key indexed by index i. In blocks 2308-2313, the component loops generating the chain of hashes for the WOTS private key indexed by index i and storing at least some of the hashes in the cache. In block 2308, the component initializes an index j to index through the chain of hashes. In decision block 2309, if the index j is greater than the maximum bit-value of a unit plus one ($2^{szUnit}$) then the component continues at block 2314, else the component continues at block 2310. In block 2310, the component calculates the next value in the chain of hashes. In decision block 2311, if the index j is a multiple of the interval, then the component continues at block 2312, else the component continues at block 2313. In block 2312, the component stores that hash for index j in the cache. In block 2313, the component increments the index j and loops to block 2309. In block 2314, the component stores the hash as WOTS public key for index i, increments index i, and loops to block 2306.

Figure 24:
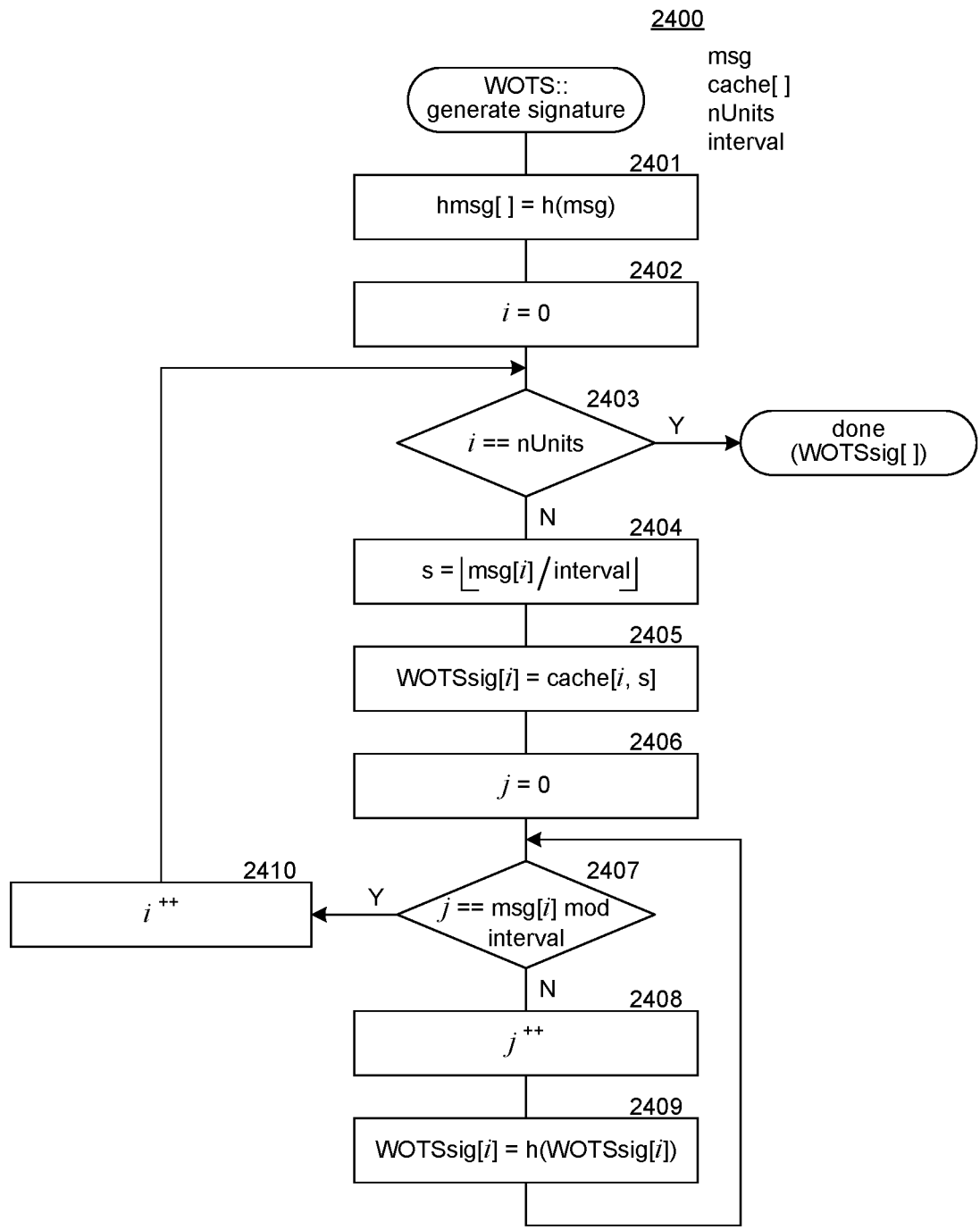
FIG. 24 is a flow diagram of a generate signature with caching component for an WOTS scheme of the BPQS system in some embodiments.

FIG. 24 is a flow diagram of a generate signature with caching component for an WOTS scheme of the BPQS system in some embodiments. The generate signature with caching component 2400 is invoked passing an indication of a message, the number of units in the message, a cache, and a caching interval. The component signs the message using the hashes in the cache without having to regenerate a chain of hashes from the WOTS private keys. In block 2401, the component generates a hash of the message. In block 2402, the component initializes an index i into the units. In decision block 2403, if the index is equal to the number of units, then the component completes indicating the WOTS signature, else the component continues at block 2404. In block 2404, the component sets an index s to point to the entry in the cache that stores the hash of the chain of hashes to be used as the starting point for generating the hash for the value of the indexed unit. Index s is set to the integer part of the bit-value of the unit divided by the interval. In block 2405, the component initializes the signature for the indexed unit to the cached hash. In block 2406, the component initializes a counter j to track the number of times the cached hash has been further hashed. In decision block, 2407, if the counter j is equal to the remainder of the indexed unit of the message divided by the interval, then the component continues at block 2410, else the component continues at block 2408. In block 2408, the component increments the counter j. In block 2409, the component sets the signature for the indexed unit to a hash of the current value of the signature for the indexed unit and then loops to block 2407. In block 2410, the component increments the index i to the next unit and loops to block 2403.

Short WOTS Signature Checksum

A WOTS-based scheme may use a checksum to help ensure that that changes are not made to the message being signed. A WOTS scheme employs a chain of hashes to sign a message. For example, if a unit to be signed is four bits and the value of the unit is 8, then the signature for the value of 8 may be represented as $h^9(priv)$. An interceptor of the signature could assert that the signer signed a forged message that includes 9, rather than 8, as the value of the unit. The interceptor could then change the signature for the unit to $h^{10}(priv)$ by performing one hash of the actual signature of the unit $h(h^9(priv))$, which is equal to $h^{10}(priv)$. If the signature was on a hash of an original message, an interceptor could generate a hash of a forged message and assuming that the values of each unit of the hash of the forged message are greater than or equal to the values of the corresponding unit of the hash of the original message, then the interceptor could forge the signature of the signer on the forged message.

To prevent such forgeries, WOTS schemes typically employ a checksum that may be simply a sum of the units. For example, if the signature includes four units of four bits each, then the maximum checksum is 60 (i.e., $4*(2^4-1)$). The checksum could then be represented by two additional units. If the value of the units of the message are 4, 5, 9, and 10, then the checksum could be 28, which can be represented as "00011100." The checksum units can be represented as $h^2(priv[1])$ and $h^{13}(priv[0])$. However, an interceptor could change the 9 in the message to 10 and change the checksum signature to $h^{14}(priv[0])$. So, to prevent such forging, the checksum may be calculated as the summation of $2^{szUnit}-1$ minus the value for each unit. For example, the checksum for the units of 4, 5, 9, and 10 would be the summation of 12, 11, 7, and 6, which is 32, which can be represented as "00100000." The checksum signature can be represented as $h^3(priv[1])$ and $h^1(priv[0])$. If an interceptor attempted to change the 9 to a 10, then the corresponding checksum would be 31, which can be represented as "00011111." The corresponding checksum signature would need to be $h^2(priv[1])$ and $h^{16}(priv[0])$, which the interceptor could not generate because the interceptor can only increase the number of hashes, not decrease from $h^3(priv[1])$ to $h^2(priv[1])$.

The BPQS system allows the number of checksum units and the number of bits within each checksum unit to vary to accommodate a tradeoff between size of checksum signature and summation of the lengths of the chain of hashes. Continuing with the example, if the maximum checksum is 60, then the checksum could be represented using one checksum unit of 6 bits with a chain of hashes of length 60. With one checksum unit of 6 bits, the checksum signature would take up a small amount of storage but the total number of hashes needed to sign and verify is 60. In contrast, with two checksum units of 4 bits, the checksum signature would take up twice the storage, but the total number of hashes needed would be 32. Thus, the selection of one 6-bit checksum unit would trade decreased storage for an increased processing power to generate the hashes, and the selection of two 4-bit checksum units would trade increased storage for a decreased processing power to generate the hashes. In the example of a maximum checksum of 60, only 6 bits are needed to represent the checksum. The BPQS system may select different numbers of checksum units with different number of bits per checksum unit such as one 6-bit unit, one 5-bit unit and one 1-bit unit, one 4-bit unit and one 2-bit unit, two 3-bit units, two 1-bit units and one 4-bit unit, and so on. Given the number of checksum units, the BPQS system selects checksum units of equal size to the extent possible with only one checksum unit having a different size. For example, with a maximum checksum of 60 and two checksum units, the BPQS system selects 3 bits per checksum unit. In such a case, the sum of the chain of hashes is 14 (i.e., $2*(2^3-1)$). If a 2-bit checksum unit and a 4-bit checksum unit were used, the sum the chain of hashes would be 18 (i.e., $2^3-1+2^4-1$). Thus, selecting two, 3-bit checksum units would have the same storage requirements as with a 2-bit checksum unit and a 4-bit checksum unit, but would have less computational expense (i.e., 14 versus 18 hashes). So, given a storage requirement (i.e., number of checksum units), the BPQS system selects a number of bits for each checksum unit that minimizes the processing power. Conversely, given a processing power requirement (i.e., number of hashes), the BPQS system selects the number of checksum units to meet that requirement. For example, if the requirement is to have no more than 10 hashes, three 2-bit checksum units would have a storage requirement of three with 9 hashes, which is better than the 10 hashes of one 3-bit checksum unit, one 2-bit checksum unit, and 1-bit checksum unit. Thus, by not limiting the size of a checksum unit to the same size as a data (or message) unit, the BPQS system can select a desired tradeoff between storage and processing power.

Figure 25:
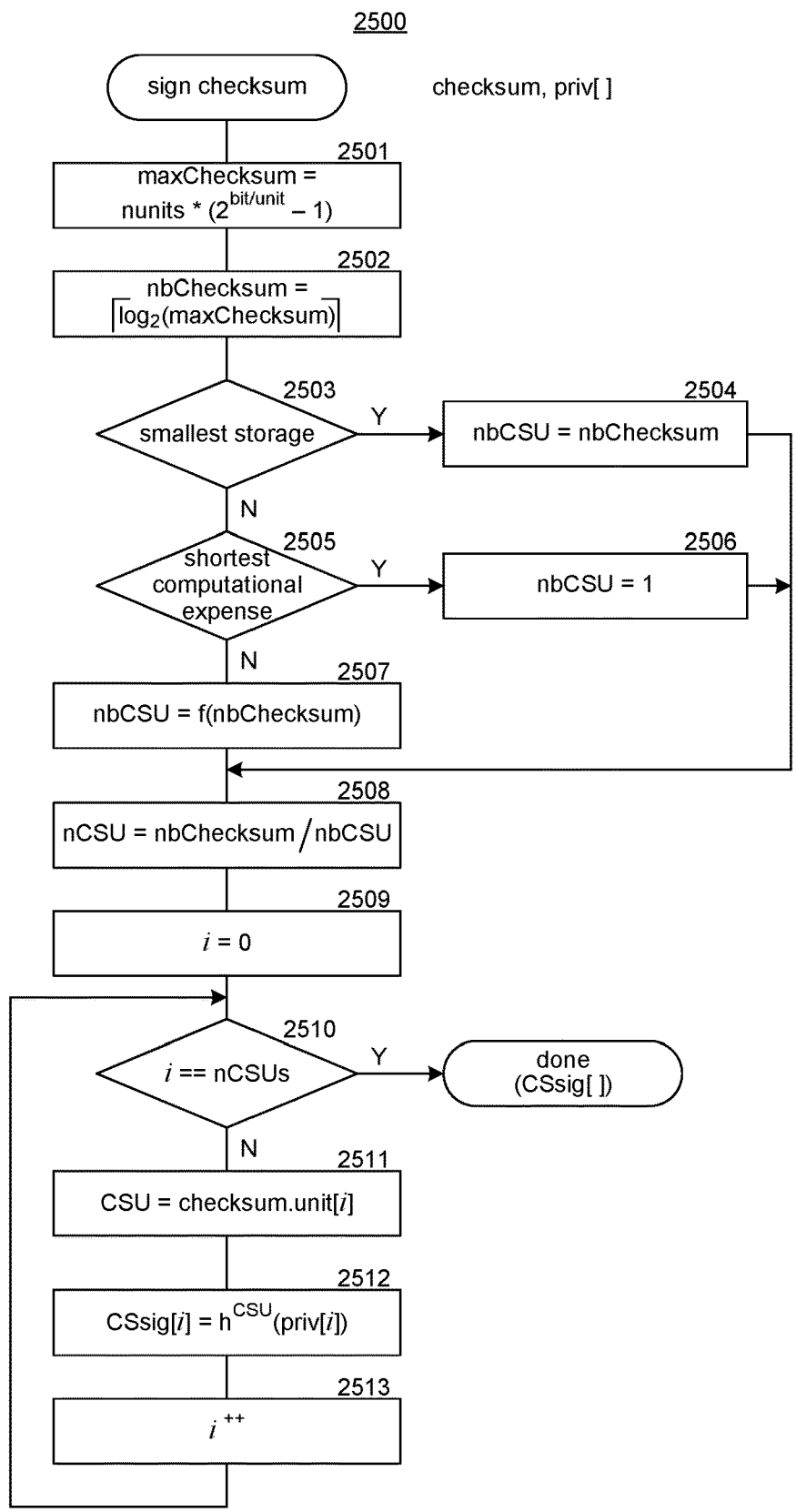
FIG. 25 is a flow diagram that illustrates the processing of a sign checksum component of the BPQS system in some embodiments.

FIG. 25 is a flow diagram that illustrates the processing of a sign checksum component of the BPQS system in some embodiments. The sign checksum component 2500 generates a signature for a checksum for a message. The component is passed an indication of the checksum and WOTS private keys (priv[ ]) for signing the checksum. In block 2501, the component calculates the maximum possible value for a checksum for a message (maxChecksum), which is the number of units of the message times the maximum value of a unit. In block 2502, the component calculates the number of bits needed to represent the checksum (nbChecksum) as log 2(maxChecksum) rounded up. In decision block 2503, if the requirement is for the smallest storage, then the component continues at block 2504, else the component continues at block 2505. In block 2504, the component sets the number of bits of the checksum unit (nbCSU) to be the number of bits of the checksum. In decision block 2505, if the requirement is for the smallest computational expense, then the component continues at block 2506, else the component continues at block 2507. In block 2506, the component sets the number of bits of the checksum unit to one. In block 2507, the component may apply a function to identify the number of bits for the checksum units based on a tradeoff of storage and processing power. Although not illustrated in this flow diagram, one of the checksum units may have a different number of bits than the other checksum units. In blocks 2509-2513, the component loops generating the checksum signature. In block 2509, the component initializes an index i for the checksum units. In decision block 2510, if the index i is equal to the number of checksum units, then the signature for all the checksum units has been generated and the component completes indicating the checksum signature (CSsig), else the component continues at block 2511. In block 2511, the component extracts the value (CSU) of the indexed checksum unit. In block 2512, the component sets the signature for the indexed checksum unit to a chain of the value number of hashes of the indexed WOTS private key. In block 2513, the component increments the index i and loops to block 2510.

The following paragraphs describe various embodiments of aspects of the BPQS systems. Implementation of the BPQS systems may employ any combination of the embodiments. The processing described below may be performed by a computing device with a processor that executes computer-executable instructions stored on a computer-readable storage medium that implements the BPQS systems.

Few Scheme

In some embodiments, a method performed by a computing system for generating a public key is provided. The method generates a plurality of OTS key pairs. Each OTS key pair includes an OTS private key and an OTS public key. For each of the OTS key pairs, the method generates a hash of the OTS public key of that OTS key pair. The method generates a hash that is a hash of a seed. For each OTS key pair in sequence, the method generates a hash of a hash derived from the OTS public key of that OTS key pair and a previously generated hash. The method designates as the public key a generated hash. In some embodiments, the method designates the last generated hash as the public key. In some embodiments, the previously generated hash is the last generated hash. In some embodiments, the hashes form a hash tree with the hash of the seed and the hashes derived from the OTS public keys of the OTS key pairs being the values of leaf nodes of the hash tree. In some embodiments, the generated hashes are values of root nodes of a chain of hash trees wherein the last hash tree in the chain has as the value of its root node a hash of the hash of the seed and the hash an OTS public key and the first hash tree in the chain has as the value of its root node the last generated hash. In some embodiments, the OTS key pairs are based on a Lamport OTS scheme. In some embodiments, the OTS key pairs are based on a Winternitz-based OTS scheme. In some embodiments, the seed is a hash of a non-OTS public key. In some embodiments, the public key is based on a hash of a non-OTS public key.

In some embodiments, a computer-readable storage medium storing a chain of hash trees is provided. The chain of hash trees includes a last hash tree in the chain that has a first leaf node with a value that is a hash of a seed and a second leaf node with a value that is a hash derived from a OTS public key of an OTS key pair and having a root node with a value that is a hash of the combination of the value of the first leaf node and the second leaf node. The chain of hash trees includes, for each next level in the chain until a first level, a hash tree having a first leaf node with the value of the root node of the previous level in the chain and a second leaf node with a value that is a hash derived from an OTS public key of an OTS key pair and having a root node with a value that is a hash of the combination of the value of the first leaf node and the second leaf node. In some embodiments, the value of the root node of the first level is a public key.

In some embodiments, a computing system for generating a public key is provided the computing system comprises one or more computer-readable storage mediums storing computer-executable instructions for controlling the computing system and one or more processors for executing the computer-executable instructions stored in the one or more computer-readable storage mediums. The instructions control the computing system to access a plurality of OTS key pairs, each OTS key pair including an OTS private key and an OTS public key. The instructions control the computing system to, for each of the OTS key pairs, generate a hash of the OTS public key of the OTS key pair. The instructions control the computing system to generate a public key hash that is based on a seed and hashes of the OTS public keys. The instructions control the computing system to designate the public key hash as the designated public key. In some embodiments, the computer-executable instructions that control the computing system further control the computing system to generate the OTS key pairs. In some embodiments, the computer-executable instructions that control the computing system to generate a public key hash further control the computing system to generate a hash of the seed; for each OTS key pair in sequence, generate a hash of a hash derived from the OTS public key of that OTS key pair and a previously generated hash; and designate as the public key a generated hash. In some embodiments, the hashes form a hash tree with the hash of the seed and the hashes derived from the OTS public keys of the OTS key pairs being the values of leaf nodes of the hash tree. In some embodiments, the generated hashes are values of root nodes of a chain of hash trees wherein the last hash tree in the chain has a hash of the hash of the seed and the hash an OTS public key as the value of its root node and the first hash tree in the chain has the last generated hash as the value of its root node. In some embodiments, the OTS key pairs are based on a Lamport OTS scheme. In some embodiments, the OTS key pairs are based on a Winternitz-based OTS scheme.

In some embodiments, a method performed by a computing system for generating a signature for a message is provided. The signature for use in re generates a public key based on multiple OTS key pairs. The method adds to the signature an OTS signature for the message generated using an OTS private key of an OTS key pair. The method adds to the signature metadata that includes: for each signature previously generated based on the public key, a hash derived from the OTS public key of the OTS key pair used to generate the OTS signature for that signature; and a value derived from hashes of OTS public keys for OTS key pairs not yet used to generate a signature based on the public key. In some embodiments, the OTS signature for the message includes OTS signature metadata derived from an OTS public key of an OTS key pair used to generate the OTS signature. In some embodiments, the OTS key pairs are based on a Lamport OTS scheme. In some embodiments, the OTS key pairs are based on a Winternitz-based OTS scheme.

In some embodiments, a computer-readable storage medium storing a signature based on a public key derived from multiple OTS key pairs is provided. The signature includes an OTS signature generated using an OTS private key of an OTS key pair. The signature includes metadata that includes: for each signature previously generated based on the public key, a hash derived from the OTS public key of the OTS key pair used to generate the OTS signature for that signature; and a value derived from hashes of OTS public keys for OTS key pairs not yet used to generate a signature based on the public key. In some embodiments, the OTS signature includes OTS signature metadata derived from an OTS public key of an OTS key pair used to generate the OTS signature. In some embodiments, the OTS key pairs are based on a Lamport OTS scheme. In some embodiments, the OTS key pairs are based on a Winternitz-based OTS scheme.

In some embodiments, a computing system for generating a signature for data, the signature for use in re generates a public key based on multiple OTS key pairs is provided. The computing system comprises one or more computer-readable storage mediums storing computer-executable instructions for controlling the computing system and one or more processors for executing the computer-executable instructions stored in the one or more computer-readable storage mediums. The instructions control the computing system to generate an OTS signature for the data, the OTS signature generated using an OTS private key of an OTS key pair. The instructions control the computing system to generate metadata that includes used metadata derived from one or more OTS public keys used to generate an OTS signature for one or more signatures previously generated based on the public key and not used metadata derived from one or more OTS public keys for OTS key pairs not yet used to generate a signature based on the public key. In some embodiments, n the used metadata includes for each signature previously generated based on the public key, a hash derived from the OTS public key of OTS key pair used to generate the OTS signature for that previously generated signature. In some embodiments, the not used metadata includes a hash derived from the one or more OTS public keys for OTS key pairs not yet used to generate a signature based on the public key. In some embodiments, the OTS key pairs are based on a Lamport OTS scheme. In some embodiments, the OTS key pairs are based on a Winternitz-based OTS scheme.

In some embodiments, a method performed by a computing system for re generates a public key is provided. The public key is generated from OTS public keys of multiple OTS key pairs. The method accesses a signature having: an OTS signature generated using an OTS key pair; for each OTS key previously used to generate a signature if any, a used hash derived from an OTS public key of the OTS key pair; and a not used hash derived from a seed and hashes of OTS public keys for OTS key pairs if any not yet used to generate a signature based on the public key. The method regenerates an OTS public key from the OTS signature. The method generates as a value for a new root a hash of a combination of the not used hash of and the regenerated OTS public key. The method, for each used hash in reverse order of usage, generates as a value for a new root a hash of a combination of the value of the last root and a hash of the OTS public key of the OTS key pair. The last generated value for a new root node is the regenerated public key. In some embodiments, the OTS signature has a signature generated using an OTS private key of the OTS key pair used to generate the OTS signature and metadata. The metadata is derived from an OTS public key of the OTS key pair used to generate the OTS signature. In some embodiments, the OTS key pairs are based on a Lamport OTS scheme. In some embodiments, the OTS key pairs are based on a Winternitz-based OTS scheme.

In some embodiments, a computing system for re generates a public key, the public key generated from OTS public keys of multiple OTS key pairs is provided. The computing system comprises one or more computer-readable storage mediums storing computer-executable instructions for controlling the computing system one or more processors for executing the computer-executable instructions stored in the one or more computer-readable storage mediums. The instructions to access a signature having an OTS signature and metadata. The instructions to regenerate an OTS public key from the OTS signature generated using an OTS key pair. The instructions to generate the public key as a hash based on the regenerated OTS public key, not used metadata of the signature, and used metadata of the signature, the used metadata derived from one or more OTS public keys of OTS key pairs if any used to generate an OTS signature for one or more signatures previously generated based on the public key, the not used metadata derived from one or more OTS public keys for OTS key pairs if any not yet used to generate a signature based on the public key. In some embodiments, the used metadata includes a hash of each OTS public key previously used to generate a signature. In some embodiments, the OTS key pairs are based on a Lamport OTS scheme. In some embodiments, the OTS key pairs are based on a Winternitz-based OTS scheme.

In some embodiments, a method performed by a computing system for generates a public key is provided. The method generates a plurality of OTS key pairs. The method generates a hash derived from the OTS public keys of the OTS key pairs wherein the hash is the public key.

In some embodiments, a method generates a signature for content based on a public key is provided. The method adds to the signature a OTS of the content, the OTS signature generated based on an OTS key pair used to generate the public key. The method adds to the signature metadata to generate the public key based on one or more other OTS key pairs used to generate the public key. In some embodiments, the metadata includes: zero or more hashes that are each derived from an OTS key pair used to generate a signature based on the public key; and a hash derived from an OTS key pair not used to generate a signature based on the public key.

In some embodiments, a method performed by a computing system for regenerating a public key generated based on multiple OTS key pairs is provided. The method regenerates, from a signature and content, an OTS public key of one of the OTS key pairs used to sign the content. The method generates a hash derived from the regenerated OTS public key and metadata of the signature, the metadata being derived from one or more other OTS key pairs used to generate the public key. In some embodiments, the metadata includes: zero or more hashes that are each derived from an OTS key pair used to generate a signature based on the public key; and a hash derived from an OTS key pair not used to generate a signature based on the public key.

Many Scheme

In some embodiments a method performed by a computing system for generating a public key is provided. The method generates a first OTS key pair that includes a first OTS private key and a first OTS public key. The method generates a first fallback OTS key pair that includes a first fallback OTS private key and a first fallback OTS public key. The method generates as the public key a hash of a hash of the first fallback OTS public key and a hash of the first OTS public key. The first OTS private key is for signing a first message and the first fallback OTS private key is for signing a hash of a hash of a second fallback OTS public key of second fallback OTS key pair and hash of a second OTS public key of a second OTS key pair. In some embodiments, the OTS key pairs are based on a Lamport OTS scheme. In some embodiments, the OTS key pairs are based on a Winternitz-based OTS scheme. In some embodiments. The method generates a first signature of the first message that includes a first OTS signature of the first message and a hash of the first fallback OTS public key. In some embodiments, the method generates a second signature of a second message that includes a second OTS signature of the second message based on a second OTS private key of the second OTS key pair and includes a hash of the first OTS public key. In some embodiments, the second signature includes a hash of a second fallback OTS public key of a second fallback OTS key pair.

In some embodiments, a computer-readable storage medium storing a hash tree is provided. The hash tree comprises a hash of an OTS public key of a OTS key pair that includes an OTS private key and the OTS public key. The hash tree comprises a hash of a fallback OTS public key of a fallback OTS key pair that includes a fallback OTS private key and the fallback OTS public key. The hash tree comprises a hash of the hash of the fallback OTS public key and a hash of the OTS public key. In some embodiments, the hash of the hash of the fallback OTS public key and a hash of the OTS public key is a public key In some embodiments, a computing system for generating a public key is provided. The computing system comprises one or more computer-readable storage mediums that store a OTS public key of an OTS key pair and a fallback OTS public key of a fallback OTS key pair. The computing system comprises computer-executable instructions for controlling the computing system to generate a hash of a hash of the fallback OTS public key and a hash of the OTS public key. The computing system comprises one or more processors for executing the computer-executable instructions stored in the one or more computer-readable storage mediums. In some embodiments, an OTS private key of the OTS key pair is for signing a message and a fallback OTS private key of the fallback OTS key pair is for signing a hash of a hash of another fallback OTS public key of another fallback OTS key pair and hash of another OTS public key of another OTS key pair. In some embodiments, the OTS key pairs are based on a Lamport OTS scheme. In some embodiments, the OTS key pairs are based on a Winternitz-based OTS scheme. In some embodiments, the computer-executable instructions further include instructions to generate a signature of a message that includes an OTS signature of the message and a hash of the fallback OTS public key. In some embodiments, the computer-executable instructions further include instructions to generate another signature of another message that includes another OTS signature of the other message using another OTS private key of another OTS key pair and a hash of the OTS public key. In some embodiments, the other signature includes a hash an another fallback OTS public key of another fallback OTS key pair.

In some embodiments, a method performed by a computing system for generating a signature for content is provided. The signature for use in regenerating a public key based on a OTS key pair. The method adds to the signature an OTS signature for the content generated using an OTS private key of an OTS key pair. The method adds to the signature a hash of a fallback OTS public key of a fallback OTS key pair wherein the public key is a hash of the hash of the fallback OTS public key and a hash of the OTS public key. In some embodiments, the method adds to the signature a hash of the OTS public key of each OTS key pair previously used to sign content based on the public key. In some embodiments, the method generates a second signature of second content, the second signature regenerating the public key by: adding to the second signature a second OTS signature for the second content generated using a second OTS private key of a second OTS key pair; adding to the second signature a hash of a second fallback OTS public key of a second fallback OTS key pair; and adding to the second signature a hash of the OTS public key. In some embodiments, the method generates another signature of other content, the other signature for regenerating the public key by: adding to the other signature another OTS signature for the other content generated using another OTS private key of another OTS key pair; adding to the other signature a hash of another fallback OTS public key of another fallback OTS key pair; and adding to the other signature a hash of each OTS public key of OTS key pairs previously used to sign content based on the public key. In some embodiments, the other signature includes an indication of the number of OTS key previously used to sign content based on the public key. In some embodiments, the OTS key pairs are based on a Lamport OTS scheme. In some embodiments, the OTS key pairs are based on a Winternitz-based OTS scheme.

In some embodiments, a computer-readable storage medium storing a signature based on a public key derived from a OTS key pair is provided. The signature comprises: an OTS signature generated based on an OTS private key of the OTS key pair; and a hash of a fallback OTS public key of a fallback OTS key pair. In some embodiments, the signature further comprises a hash of each OTS public key of OTS key pairs previously used to sign content based on the public key.

In some embodiments, a computing system for generating a signature for content is provided. The signature is based on a public key. The computing system comprises one or more computer-readable storage mediums storing computer-executable instructions for controlling the computing system and one or more processors for executing the computer-executable instructions stored in the one or more computer-readable storage mediums. The instructions control the computing system to add to the signature a OTS for the content generated using an OTS private key of an OTS key pair; for each OTS key pair if any previously used to generate a signature based on the public key, a hash of the OTS public key of that OTS key pair; and add to the signature a hash of a fallback OTS public key of a fallback OTS key pair. In some embodiments, the computer-executable instructions further comprise instructions to add to the signature a hash of the OTS public key of each OTS key pair previously used to sign content based on the public key. In some embodiments, in the computer-executable instructions further comprise instructions to generate a second signature of second content, the second signature for regenerating the public key, the instructions for controlling the computing system to add to the second signature a second OTS signature for the second content generated using a second OTS private key of a second OTS key pair; add to the second signature a hash of a second fallback OTS public key of a second fallback OTS key pair; and add to the second signature a hash of the OTS public key.

In some embodiments, a method performed by a computing system for regenerating a public key is provided. The public key is generated from a public key of an OTS key pair and a fallback OTS public key of a fallback OTS key pair. The method comprises accessing a signature having: a OTS generated using the OTS key pair; for each OTS key pair previously used to generate a signature based on the public key if any, a prior hash derived from an OTS public key of that OTS key pair; and a hash of a fallback OTS public key of a fallback OTS key pair. The method regenerates an OTS public key from the OTS signature. The method generates a hash derived from a hash of the OTS public key and the hash of the fallback OTS public key. For each prior hash if any, the method generates a hash of that prior hash and the last generated hash. The last generated hash is the regenerated public key.

In some embodiments, a method performed by a computing system generating a public key is provided. The method generates an OTS key pair. The method generates a fallback OTS key pair. The method generates a hash derived from an OTS public key of the OTS key pairs and a fallback OTS public key of the fallback OTS key pair.

In some embodiments, a method performed by a computing system for generating a signature for content based on a public key is provided. The method adds to the signature a OTS signature of the content. The OTS signature is generated based on an OTS key pair used to generate the public key. The method adds to the signature a fallback OTS public key of a fallback OTS key pair. In some embodiments, the method adds to the signature a hash of the OTS public key of each OTS key pair previously used to generate a signature based on the public key.

In some embodiments, a method performed by a computing system for regenerating a public key from a signature and content is provided. The method generates, from the signature and the content, an OTS public key of an OTS key pair used to sign the content. The method generates a hash derived from the regenerated OTS public key and a hash of a fallback OTS public key of the signature.

Combined Scheme

In some embodiments, a method performed by a computing system for generating a public key is provided. The method generates multiple OTS key pairs. The method generates a fallback OTS key pair. The method generates a hash derived from the multiple OTS key pairs and the fallback OTS key pair wherein the hash is the public key. In some embodiments, the generating of the hash further generates a first hash derived from a hash of a fallback OTS public key of the fallback OTS key pair and a hash of a first OTS public key of first OTS key pair; and for each other OTS key pair, generates a next hash derived from an OTS public key of the OTS key pair and the last generated hash. In some embodiments, the OTS key pairs are based on a Lamport OTS scheme. In some embodiments, the OTS key pairs are based on a Winternitz-based OTS scheme.

In some embodiments, a method performed by a computing system for generating a signature for content based on a public key is provided. The method adds to the signature a OTS signature of the content. The OTS signature is generated based on an OTS key pair used to generate the public key. The method adds to the signature metadata to generate the public key based on one or more other OTS key pairs used to generate the public key and a fallback OTS key pair. In some embodiments, the metadata includes: zero or more hashes that are each derived from an OTS key pair used to generate a signature based on the public key; and a hash derived from an OTS key pair not used to generate a signature based on the public key and the fallback OTS key pair. In some embodiments, at least some of the OTS key pairs used to generate a signature were not used to generate the public key.

In some embodiments, a method performed by a computing system for regenerating a public key from a signature and content is provided. The method generates, from the signature and content, an OTS public key of an OTS key pair used to sign the content. The method regenerates a hash derived from the regenerated OTS public key and metadata of the signature. The metadata is derived from one or more other OTS key pairs used to generate the public key and a fallback OTS key pair. In some embodiments, the metadata includes: zero or more hashes that are each derived from an OTS key pair used to generate a signature based on the public key; and a hash derived from an OTS key pair not used to generate a signature based on the public key and the fallback OTS key pair.

Signatures on Linked Data Structures

In some embodiments, a method performed by a computing system generating signatures for multiple instances of content is provided. The method generates a public key based on a first OTS key pair and a first fallback OTS key pair. The method generates a first signature of a first instance that includes a first OTS signature based on the first OTS key pair and first metadata based on the first fallback OTS key pair. The method generates a second signature of a second instance that includes a second OTS signature based on a second OTS key pair and second metadata based on a second fallback OTS key pair and a fallback OTS signature of data derived from the second OTS key pair and the second fallback OTS key pair generated based on the first fallback OTS key pair. In some embodiments, the first public key is a hash of a hash of a first OTS public key of the first OTS key pair and of a hash of a first fallback OTS public key of the first fallback OTS key pair. In some embodiments, the first metadata includes a hash of a first fallback OTS public key of the first fallback OTS key pair. In some embodiments, the second metadata includes a hash of a second fallback OTS public key of the second fallback OTS key pair and the fallback OTS signature is of data that includes a hash of a hash of the second fallback OTS public key and of a hash of a second OTS public key of the second OTS key pair. In some embodiments, each instance of content is a block of a distributed ledger. In some embodiments, the distributed ledger is a blockchain. In some embodiments, each instance is a transaction to be recorded in a distributed ledger. In some embodiments, the transactions form a sequence of transactions. In some embodiments, the second metadata includes a reference to the first instance.

In some embodiments, a method performed by a computing system for verifying a signature of an instance of a sequence of instances of content is provided. The method accesses a signature for the instance. The signature includes an OTS signature of the instance generated based on OTS key pair and including metadata based on a fallback OTS public key of a fallback OTS key pair and a fallback OTS signature of data derived from the OTS key pair and the fallback OTS public key. The fallback OTS signature is generated based on a prior fallback OTS key pair of a prior instance in the sequence. The method generates an OTS public key based on the instance and the OTS signature of the instance. The method generates a value based on the fallback OTS public key and the regenerated OTS public key. The method generates a fallback OTS public key based on the generated value and the fallback OTS signature. The method indicates that the signature is verified when a hash of the regenerated fallback OTS public key matches a hash of a prior fallback OTS public key of the prior fallback OTS key pair. In some embodiments, the metadata includes a hash of a fallback OTS public key of the fallback OTS key pair and the fallback OTS signature is of a hash of a hash of the fallback OTS public key and of a hash the OTS public key of the OTS key pair. In some embodiments, each instance of content is a block of a distributed ledger. In some embodiments, the distributed ledger is a blockchain. In some embodiments, each instance is a transaction to be recorded in a distributed ledger. In some embodiments, the OTS key pairs are based on a Lamport OTS scheme. In some embodiments, the OTS key pairs are based on a Winternitz-based OTS scheme.

Faster Signature Verification

In some embodiments, a method performed by a computing system for generating a signature for data is provided. The method identifies a nonce such that a target hash of a combination of the data and the nonce has a target characteristic. The method signs the target hash with a private key. The method provides the signed target hash as the signature with the nonce as metadata of the signature. In some embodiments, a public key corresponding to the private key is a hash of the private key. In some embodiments, the signature is based on a OTS technique. In some embodiments, the target characteristic is a pattern of pattern bits within the target hash with each pattern bit having a pattern value. In some embodiments, the signing of the target hash is based on bits that are not pattern bits. In some embodiments, the target hash has pattern bits and non-pattern bits, the private key is a OTS private key with a private key pair for each non-pattern bit, and for each non-pattern bit, the signature includes one of the private keys of the private key pair for each non-pattern bit. In some embodiments, the private key includes a private key pair for only non-pattern bits. In some embodiments, the target characteristic is based on number of bits having a value of 1. In some embodiments, the signature is based on zero or more hashes of a private key for a bit or group of bits. In some embodiments, the target characteristic is a pattern of pattern bits within the target hash with each pattern bit having a pattern value and wherein a private key and corresponding public key do not include values for pattern bits. In some embodiments, the target characteristic is a pattern of pattern bits within the target hash with each pattern bit having a pattern value and the signature does not include a value for the pattern bits. In some embodiments, the target characteristic is that a target number of bits in sequence of the target hash has a target value.

In some embodiments, a method performed by a computing system for verifying a signature of data is provided. The method accesses the signature that includes a signature portion and a nonce. The signature portion is based on a private key. The method generates a hash of a combination of the data and the nonce. The nonce such that the generated hash has pattern bits of a pattern and non-pattern bits. The method verifies that the signature portion can be used to generate a public key corresponding to the private key for the non-pattern bits. In some embodiments, a public key corresponding to the private key is a hash of the private key. In some embodiments, the signature is based on a OTS technique. In some embodiments, the private key is a OTS private key with a private key pair for each non-pattern bit, and for each non-pattern bit. The signature includes one of the private keys of the private key pair for each non-pattern bit. In some embodiments, the private key includes a private key pair for only non-pattern bits. In some embodiments, the signature includes an identification of the pattern as metadata. In some embodiments, the pattern is that a target number of bits in sequence of the target hash have a target value. In some embodiments, the signature is verified by a notary computing system. In some embodiments, the notary computing system notarizes transactions of a distributed ledger.

In some embodiments, one or more computing systems for verifying a signature of a data is provided. The one or more computing systems comprise one or more computer-readable storage mediums storing computer-executable instructions for controlling the one or more computing systems one or more processors for executing the computer-executable instructions stored in the one or more computer-readable storage mediums. The instructions control the one or more computing systems to generate a hash of a combination of the data and the nonce, the nonce such that the generated hash has pattern bits of a pattern and non-pattern bits; and verify that the signature can be used to generate a public key corresponding to the private key for the non-pattern bits. In some embodiments, the signature is based on a OTS technique.

Caching WOTS Hash Chain

In some embodiments, a method performed by a computing system for generating a signature based on a chain of hashes is provided. The signature is generated using a private key for each unit of data to be signed. For each of the private keys, the method generates hash values for one or more multiple hashes of the private key. Each hash value represents a number of hashes of the private key. The number corresponds to one of the possible bit-values of a unit. After generating the hash values, the method receives an indication of the data; and for units of the data, retrieves a hash value for the unit of the data that corresponds to a bit-value that is not greater than the bit-value of the unit; and performs zero or more hashes of the hash value so that the hash value corresponds to the bit-value of the unit. The signature includes the hash values that correspond to the bit-values of the units of the data. In some embodiments, the signature represents a Winternitz-based OTS. In some embodiments, a hash value is generated for each possible bit-value of a unit. In some embodiments, a hash value is generated for possible bit-values of a unit that are an interval apart. In some embodiments, the generated hash values are stored in a cache for use when signing the data. In some embodiments, the hash values are generated prior to the data being accessed. In some embodiments, each private key is a random number with a corresponding public key being a number of hashes of the private key that is based on the maximum bit-value of a unit. In some embodiments, the data is a hash of target data.

In some embodiments, a method performed by a computing system for generating private keys and public keys for units of data to be signed is provided. For each unit, the method generates a private key for the unit; generates a public key that is based on a chain of hashes of the private key for the unit wherein the number of hashes in the chain is based on a maximum bit-value of a unit; and while generating the public key for the unit, caches at least some of the hashes of the chain so that when data is to be signed using the private key, the cached hashes can be used to avoid regenerating at least some of the hashes needed to sign the data. In some embodiments, the caching caches hashes representing bit-values of units separated by an interval. In some embodiments, the data is a hash of content that the signing is to verify. In some embodiments, the method further signs the data by, for at least some of the units of the data, retrieving a cached hash for that unit and generating one or more hashes of the hash chain for that unit. In some embodiments, a chain of hashes for a unit starts with a hash of the private key of the unit and the method repeatedly generates a hash of the prior hash. In some embodiments, the method publishes a hash of the public keys as a published public key.

In some embodiments, one or more computing systems generating a private key and a public key is provided. The one or more computing system comprise one or more computer-readable storage mediums storing computer-executable instructions for controlling the one or more computing systems and one or more processors for executing the computer-executable instructions stored in the one or more computer-readable storage mediums. The instructions generate the private key; generate a public key that is based on a chain of hashes of the private key wherein the number of hashes in the chain is based on a maximum value of data to be signed with the private key; and store at least some of the hashes of the chain so that when data is to be signed using the private key, the stored hashes of the chain can be used to avoid regenerating at least some of the hashes needed to sign the data. In some embodiments, a private key and a public key are generated for each unit of data to be signed with a private key and at least some of the hashes of the chain for each unit are stored. In some embodiments, the computer-executable instructions include instructions to: for units of the data, retrieve a hash for the unit of the data that corresponds to a bit-value that is not greater than the bit-value of the unit; and perform zero or more hashes of the hash so that the hash corresponds to the bit-value of the unit. The signature includes the hashes that correspond to the bit-values of the units of the data. In some embodiments, the private key is a one-time key. In some embodiments, the private key is for signing data based on a Winternitz-based signing technique.

Short WOTS Signature Checksum

In some embodiments, a method performed by a computing system for generating a signature for data is provided. The method divides the data into data units, each data unit having a same data unit number of bits and a value. For each data unit of the data, the method generates a chain of hashes with a length that is based on the value of that data unit. The method generates a checksum for the data. The method divides the checksum into one or more checksum units. Each checksum unit has a number of bits and a value. At least one checksum unit has a number of bits that is different from the data unit number of bits. For each checksum unit of the checksum, the method generates a chain of hashes with a length that is based on the value of that checksum unit. In some embodiments, the at least one checksum unit has more bits than the data unit number of bits. In some embodiments, the at least one checksum unit has less bits than the data unit number of bits. In some embodiments, the checksum is divided into one checksum unit. In some embodiments, the method generates a summation based on the values of the data units. In some embodiments, the signature is based on a OTS scheme. In some embodiments, the signature is based on a Winternitz-based OTS scheme.

In some embodiments, a method performed by a computing system for encoding a checksum for Winternitz-based OTS scheme is provided. The method identifies a maximum possible value for a checksum; selects a number of bits for each checksum unit based on number of checksum units and maximum length of chain of hashes to encode a checksum unit; and for each checksum unit of the checksum, generates a chain of hashes with a length that is based on the value of that checksum unit. In some embodiments, the smaller the number of checksum units the smaller the encoding and the longer the chain of hashes. In some embodiments, the larger the number of checksum units the larger the encoding and the shorter the chain of hashes. In some embodiments, the checksum is for a signature generated using the Winternitz-based OTS scheme. In some embodiments, the method selects a larger number of bits of a checksum unit to reduce the number of checksum units when the sum of the maximum length of the chain of hashes does not increase.

In some embodiments, one or more computing systems for encoding a checksum of data signed using a Winternitz-based OTS scheme is provided. The one or more computing systems comprise one or more computer-readable storage mediums storing computer-executable instructions for controlling the one or more computing systems and one or more processors for executing the computer-executable instructions stored in the one or more computer-readable storage mediums. The instructions identify a number of bits for each checksum unit such that at least one checksum unit has a number of bits that is different from the number of bits of the units of the data; and for each checksum unit of the checksum, generate a chain of hashes with a length that is based on the value of that checksum unit.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A method performed by a computing system for generating a public key, the method comprising:
   generating a plurality of one-time signature ("OTS") key pairs, each OTS key pair including an OTS private key and an OTS public key;
   for each of the OTS key pairs, generating a hash of the OTS public key of that OTS key pair;
   generating a hash that is a hash of a seed, the seed being a random number that is not an OTS private key or an OTS public key;
   for each OTS key pair in sequence, generating a hash of a hash derived from the OTS public key of that OTS key pair and a previously generated hash; and
   designating as the public key a generated hash.

2. The method of claim 1 wherein the designating designates the last generated hash as the public key.

3. The method of claim 1 wherein the previously generated hash is the last generated hash.

4. The method of claim 1 wherein the hashes form a hash tree with the hash of the seed and the hashes derived from the OTS public keys of the OTS key pairs being the values of leaf nodes of the hash tree.

5. The method of claim 1 wherein the generated hashes are values of root nodes of a chain of hash trees wherein the last hash tree in the chain has as the value of its root node a hash of the hash of the seed and the hash an OTS public key and the first hash tree in the chain has as the value of its root node the last generated hash.

6. The method of claim 1 wherein the OTS key pairs are based on a Lamport OTS scheme.

7. The method of claim 1 wherein the OTS key pairs are based on a Winternitz-based OTS scheme.

8. The method of claim 1 wherein the public key is based on a hash of a non-OTS public key.

9. A method performed by a computing system for generating a public key, the method comprising:
generating a first one-time signature ("OTS") key pair that includes a first OTS private key and a first OTS public key;
generating a first tailback OTS key pair that includes a first tailback OTS private key and a first tailback OTS public key; and
generating as the public key a hash of a hash of the first tailback OTS public key and a hash of the first OTS public key,
wherein the first OTS private key is for signing a first message and the first tailback OTS private key is for signing a hash of a hash of a second tailback OTS public key of second tailback OTS key pair and hash of a second OTS public key of a second OTS key pair.

10. The method of claim 9 wherein the OTS key pairs are based on a Lamport OTS scheme.

11. The method of claim 9 wherein the OTS key pairs are based on a Winternitz-based OTS scheme.

12. The method of claim 9 further comprising generating a first signature of the first message that includes a first OTS signature of the first message and a hash of the first tailback OTS public key.

13. A method performed by a computing system for generating a public key, the method comprising:
generating multiple OTS key pairs;
generating a tailback OTS key pair; and
generating a hash derived from the multiple OTS key pairs and the tailback OTS key pair wherein the hash is the public key.

14. The method of claim 13 wherein the generating of the hash further comprises:
generating a first hash derived from a hash of a tailback OTS public key of the tailback OTS key pair and a hash of a first OTS public key of first OTS key pair; and
for each other OTS key pair, generating a next hash derived from an OTS public key of the OTS key pair and the last generated hash.

15. The method of claim 13 wherein the OTS key pairs are based on a Lamport OTS scheme.

16. The method of claim 13 wherein the OTS key pairs are based on a Winternitz-based OTS scheme.

17. A method performed by a computing system for generating a signature for content based on a public key, the method comprising:
adding to the signature a one-time signature ("OTS") signature of the content, the OTS signature generated based on an OTS key pair used to generate the public key; and
adding to the signature metadata to generate the public key based on one or more other OTS key pairs used to generate the public key and a tailback OTS key pair, wherein the metadata includes:
zero or more hashes that are each derived from an OTS key pair used to generate a signature based on the public key; and
a hash derived from an OTS key pair not used to generate a signature based on the public key and the tailback OTS key pair.

18. The method of claim 17 wherein at least some of the OTS key pairs used to generate a signature were not used to generate the public key.

19. A method performed by a computing system for generating a signature for data, the method comprising:
identifying a nonce such that a target hash of a combination of the data and the nonce has a target characteristic;
signing the target hash with a private key; and
providing the signed target hash as the signature with the nonce as metadata of the signature.

20. The method of claim 19 wherein a public key corresponding to the private key is a hash of the private key.

21. The method of claim 19 wherein the signature is based on a one-time signature technique.

22. The method of claim 21 wherein the target characteristic is a pattern of pattern bits within the target hash with each pattern bit having a pattern value.

23. The method of claim 22 wherein the signing of the target hash is based on bits that are not pattern bits.

24. The method of claim 22 wherein the target hash has pattern bits and non-pattern bits, the private key is a one-time signature private key with a private key pair for each non-pattern bit, and for each non-pattern bit, the signature includes one of the private keys of the private key pair for each non-pattern bit.

25. The method of claim 24 wherein the private key includes a private key pair for only non-pattern bits.

26. The method of claim 19 wherein the target characteristic is based on number of bits having a value of 1.

27. The method of claim 26 wherein the signature is based on zero or more hashes of a private key for a bit or group of bits.

28. The method of claim 19 wherein the target characteristic is a pattern of pattern bits within the target hash with each pattern bit having a pattern value and wherein a private key and corresponding public key do not include values for pattern bits.

29. The method of claim 19 wherein the target characteristic is a pattern of pattern bits within the target hash with each pattern bit having a pattern value and the signature does not include a value for the pattern bits.

30. The method of claim 19 wherein the target characteristic is that a target number of bits in sequence of the target hash has a target value.

31. A method performed by a computing system for generating a signature based on a chain of hashes, the signature being generated using a private key for each unit of data to be signed, each unit of data comprising multiple bits of the data, the method comprising:
for each of the private keys, generating hash values for one or more multiple hashes of the private key, each hash value representing a number of hashes of the private key, the number corresponding to one of the possible values of a unit; and
after generating the hash values,
receiving an indication of the data; and
for units of the data,
retrieving a hash value for the unit of the data that corresponds to a value that is not greater than the value of the unit; and
performing zero or more hashes of the hash value so that the hash value corresponds to the value of the unit;
wherein the signature includes the hash values that correspond to the values of the units of the data.

32. The method of claim 31 wherein the signature represents a Winternitz-based one-time signature.

33. The method of claim 31 wherein a hash value is generated for each possible value of bit-value of a unit.

34. The method of claim 31 wherein a hash value is generated for possible values of a unit that are an interval apart.

35. The method of claim 31 wherein the generated hash values are stored in a cache for use when signing the data.

36. The method of claim 31 wherein the hash values are generated prior to the data being accessed.

37. The method of claim 31 wherein each private key is a random number with a corresponding public key being a number of hashes of the private key that is based on the maximum bit-value of a unit.

38. The method of claim 31 wherein the data is a hash of target.

39. A computer-readable storage medium storing a chain of hash trees, the chain of hash trees comprising:
   a last hash tree in the chain that has a first leaf node with a value that is a hash of a seed and a second leaf node with a value that is a hash derived from a one-time signature ("OTS") public key of an OTS key pair and having a root node with a value that is a hash of the combination of the value of the first leaf node and the second leaf node; and
   for each next level in the chain until a first level, a hash tree having a first leaf node with the value of the root node of the previous level in the chain and a second leaf node with a value that is a hash derived from an OTS public key of an OTS key pair and having a root node with a value that is a hash of the combination of the value of the first leaf node and the second leaf node.

40. The computer-readable storage medium of claim 39 wherein the value of the root node of the first level is a public key.

41. A computing system for generating a public key, the computing system comprising:
   one or more computer-readable storage mediums storing computer-executable instructions for controlling the computing system to:
      access a plurality of one-time signature ("OTS") key pairs, each OTS key pair including an OTS private key and an OTS public key;
      for each of the OTS key pairs, generate a hash of the OTS public key of the OTS key pair;
      generate a public key hash that is based on a seed and hashes of the OTS public keys; and
      designate the public key hash as the designated public key; and
   one or more processors for executing the computer-executable instructions stored in the one or more computer-readable storage mediums.

42. The computing system of claim 41 wherein the computer-executable instructions that control the computing system further control the computing system to generate the OTS key pairs.

43. The computing system of claim 41 wherein the computer-executable instructions that control the computing system to generate a public key hash further control the computing system to:
   generate a hash of the seed;
   for each OTS key pair in sequence, generate a hash of a hash derived from the OTS public key of that OTS key pair and a previously generated hash; and
   designate as the public key a generated hash.

44. The computing system of claim 41 wherein the hashes form a hash tree with the hash of the seed and the hashes derived from the OTS public keys of the OTS key pairs being the values of leaf nodes of the hash tree.

45. The computing system of claim 41 wherein the generated hashes are values of root nodes of a chain of hash trees wherein the last hash tree in the chain has a hash of the hash of the seed and the hash an OTS public key as the value of its root node and the first hash tree in the chain has the last generated hash as the value of its root node.

46. The computing system of claim 41 wherein the OTS key pairs are based on a Lamport OTS scheme.

47. The computing system of claim 40 wherein the OTS key pairs are based on a Winternitz-based OTS scheme.

48. A method performed by a computing system for generating a signature for a message, the signature for use in regenerating a public key based on multiple one-time signature ("OTS") key pairs, the method comprising:
   adding to the signature an OTS signature for the message generated using an OTS private key of an OTS key pair; and
   adding to the signature metadata that includes:
      for each signature previously generated based on the public key, a hash derived from the OTS public key of the OTS key pair used to generate the OTS signature for that signature; and
      a value derived from hashes of OTS public keys for OTS key pairs not yet used to generate a signature based on the public key.

49. The method of claim 48 wherein the OTS signature for the message includes OTS signature metadata derived from an OTS public key of an OTS key pair used to generate the OTS signature.

50. The method of claim 48 wherein the OTS key pairs are based on a Lamport OTS scheme.

51. The method of claim 48 wherein the OTS key pairs are based on a Winternitz-based OTS scheme.

52. A computer-readable storage medium storing a signature based on a public key derived from multiple one-time signature ("OTS") key pairs, the signature comprising:
   an OTS signature generated using an OTS private key of an OTS key pair; and
   metadata that includes:
      for each signature previously generated based on the public key, a hash derived from the OTS public key of the OTS key pair used to generate the OTS signature for that signature; and
      a value derived from hashes of OTS public keys for OTS key pairs not yet used to generate a signature based on the public key.

53. The computer-readable storage medium of claim 52 wherein the OTS signature includes OTS signature metadata derived from an OTS public key of an OTS key pair used to generate the OTS signature.

54. The computer-readable storage medium of claim 52 wherein the OTS key pairs are based on a Lamport OTS scheme.

55. The computer-readable storage medium of claim 52 wherein the OTS key pairs are based on a Winternitz-based OTS scheme.

56. A computing system for generating a signature for data, the signature for use in regenerating a public key based on multiple one-time signature ("OTS") key pairs, the computing system comprising:
   one or more computer-readable storage mediums storing computer-executable instructions for controlling the computing system to:

generate an OTS signature for the data, the OTS signature generated using an OTS private key of an OTS key pair; and generate metadata that includes used metadata derived from one or more OTS public keys used to generate an OTS signature for one or more signatures previously generated based on the public key and not used metadata derived from one or more OTS public keys for OTS key pairs not yet used to generate a signature based on the public key; and one or more processors for executing the computer-executable instructions stored in the one or more computer-readable storage mediums.

57. The computing system of claim 56 wherein the used metadata includes for each signature previously generated based on the public key, a hash derived from the OTS public key of OTS key pair used to generate the OTS signature for that previously generated signature.

58. The computing system of claim 56 wherein the not used metadata includes a hash derived from the one or more OTS public keys for OTS key pairs not yet used to generate a signature based on the public key.

59. The computing system of claim 56 wherein the OTS key pairs are based on a Lamport OTS scheme.

60. The computing system of claim 56 wherein the OTS key pairs are based on a Winternitz-based OTS scheme.

61. A method performed by a computing system for regenerating a public key, the public key generated from one-time signature ("OTS") public keys of multiple OTS key pairs, the method comprising:
    accessing a signature having:
        an OTS signature generated using an OTS key pair;
        for each OTS key previously used to generate a signature if any, a used hash derived from an OTS public key of the OTS key pair; and
        a not used hash derived from a seed and hashes of OTS public keys for OTS key pairs if any not yet used to generate a signature based on the public key;
    regenerating an OTS public key from the OTS signature;
    generating as a value for a new root a hash of a combination of the not used hash of and the regenerated OTS public key; and
    for each used hash in reverse order of usage, generating as a value for a new root a hash of a combination of the value of the last root and a hash of the OTS public key of the OTS key pair;
    wherein the last generated value for a new root node is the regenerated public key.

62. The method of claim 61 wherein the OTS signature has a signature generated using an OTS private key of the OTS key pair used to generate the OTS signature and metadata, the metadata being derived from an OTS public key of the OTS key pair used to generate the OTS signature.

63. The method of claim 61 wherein the OTS key pairs are based on a Lamport OTS scheme.

64. The method of claim 61 wherein the OTS key pairs are based on a Winternitz-based OTS scheme.

65. A computing system for regenerating a public key, the public key generated from one-time signature ("OTS") public keys of multiple OTS key pairs, the computing system comprising:
    one or more computer-readable storage mediums storing computer-executable instructions for controlling the computing system to:
        access a signature having an OTS signature and metadata;
        regenerate an OTS public key from the OTS signature generated using an OTS key pair; and
        generate the public key as a hash based on the regenerated OTS public key, not used metadata of the signature, and used metadata of the signature, the used metadata derived from one or more OTS public keys of OTS key pairs if any used to generate an OTS signature for one or more signatures previously generated based on the public key, the not used metadata derived from one or more OTS public keys for OTS key pairs if any not yet used to generate a signature based on the public key; and
    one or more processors for executing the computer-executable instructions stored in the one or more computer-readable storage mediums.

66. The computing system of claim 65 wherein the used metadata includes a hash of each OTS public key previously used to generate a signature.

67. The computing system of claim 65 wherein the OTS key pairs are based on a Lamport OTS scheme.

68. The computing system of claim 65 wherein the OTS key pairs are based on a Winternitz-based OTS scheme.

69. A method performed by a computing system for generating a public key, the method comprising:
    generating a plurality of one-time signature ("OTS") key pairs; and
    generating a hash derived from the OTS public keys of the OTS key pairs wherein the hash is the public key.

70. A method performed by a computing system for generating a signature for content based on a public key, the method comprising:
    adding to the signature a one-time signature ("OTS") signature of the content, the OTS signature generated based on an OTS key pair used to generate the public key; and
    adding to the signature metadata to generate the public key based on one or more other OTS key pairs used to generate the public key.

71. The method of claim 70 wherein the metadata includes:
    zero or more hashes that are each derived from an OTS key pair used to generate a signature based on the public key; and
    a hash derived from an OTS key pair not used to generate a signature based on the public key.

72. A method performed by a computing system for regenerating a public key generated based on multiple one-time signature ("OTS") key pairs, the method comprising:
    regenerating, from a signature and content, an OTS public key of one of the OTS key pairs used to sign the content; and
    generating a hash derived from the regenerated OTS public key and metadata of the signature, the metadata being derived from one or more other OTS key pairs used to generate the public key.

73. The method of claim 72 wherein the metadata includes:
    zero or more hashes that are each derived from an OTS key pair used to generate a signature based on the public key; and
    a hash derived from an OTS key pair not used to generate a signature based on the public key.

* * * * *

UNITED STATES PATENT AND TRADEMARK OFFICE
CERTIFICATE OF CORRECTION

PATENT NO. : 11,750,400 B2
APPLICATION NO. : 17/156011
DATED : September 5, 2023
INVENTOR(S) : Konstantinos Chalkias Page 1 of 1

It is certified that error appears in the above-identified patent and that said Letters Patent is hereby corrected as shown below:

On the Title Page

In item (56), in Column 2, under "Other Publications", Line 3, delete "pratical" and insert -- practical --.

In item (56), in Column 2, under "Other Publications", Line 3, delete "has" and insert -- hash --.

On the page 2, in Column 2, under "Other Publications", Line 13, delete "Falises" and insert -- Falaises --.

On the page 2, in Column 2, under "Other Publications", Line 15, delete "Arrchitecture" and insert -- Architecture --.

In the Specification

In Column 1, Line 48, delete "fora" and insert -- for a --.

In Column 7, Line 8, delete "Lam port" and insert -- Lamport --.

In Column 9, Line 23, delete "Lam port" and insert -- Lamport --.

In Column 20, Line 50, delete "publ)," and insert -- pub)), --.

In Column 24, Line 60, delete "($2^{szUnit}$)" and insert -- ($2^{szUnit}$), --.

In Column 25, Line 38, delete "that that" and insert -- that --.

In Column 27, Line 4, delete "log 2" and insert -- $\log_2$ --.

In Column 31, Line 39, delete "key" and insert -- key. --.

Signed and Sealed this
Eleventh Day of March, 2025

Coke Morgan Stewart
*Acting Director of the United States Patent and Trademark Office*